United States Patent
Nooren et al.

(10) Patent No.: US 12,196,175 B2
(45) Date of Patent: Jan. 14, 2025

(54) LIFT SYSTEM AND METHOD FOR WIND TURBINE MONOPILES AND OTHER STRUCTURES

(71) Applicant: Mammoet USA South, Inc., Rosharon, TX (US)

(72) Inventors: Piet Nooren, Angleton, TX (US); Jacobus Laurentius Tol, Manvel, TX (US); Wessel Helmens, Stolwijk (NL); Matthijs Gerard Eikelenboom, Kesteren (NL)

(73) Assignee: MAMMOET USA SOUTH, INC., Rasharon, TX (US)

( * ) Notice: Subject to any disclaimer, the term of this patent is extended or adjusted under 35 U.S.C. 154(b) by 823 days.

(21) Appl. No.: 17/337,139

(22) Filed: Jun. 2, 2021

(65) Prior Publication Data
US 2022/0389910 A1   Dec. 8, 2022

(51) Int. Cl.
| | | |
|---|---|---|
| *F03D 13/40* | (2016.01) | |
| *B66F 3/46* | (2006.01) | |
| *B66F 5/04* | (2006.01) | |

(52) U.S. Cl.
CPC ............... *F03D 13/40* (2016.05); *B66F 3/46* (2013.01); *B66F 5/04* (2013.01); *F05B 2260/02* (2013.01)

(58) Field of Classification Search
CPC ......... F03D 13/40; B66F 3/46; F05B 2260/02
USPC ....................................................... 410/44, 45
See application file for complete search history.

(56) References Cited

U.S. PATENT DOCUMENTS

| | | | |
|---|---|---|---|
| 4,697,977 A | 10/1987 | Loomer | |
| 4,944,232 A * | 7/1990 | Schlaeger | B61D 3/184 410/49 |
| 4,999,902 A | 3/1991 | Schumacher | |
| 5,509,502 A | 4/1996 | Beaulieu | |

(Continued)

FOREIGN PATENT DOCUMENTS

| | | |
|---|---|---|
| CA | 2466983 A1 | 11/2005 |
| CN | 105980699 | 8/2019 |

(Continued)

OTHER PUBLICATIONS

Doorman Long Technology, "Strand Jack Systems, Stand jacks, power packs and control systems," V2.0, pp. 1-24, undated, downloaded from www.dormanlongtechnology.com May 4, 2021.

(Continued)

*Primary Examiner* — Hilary L Gutman
(74) *Attorney, Agent, or Firm* — Cabello Hall Zinda, PLLC

(57) ABSTRACT

A system is used for lifting a heavy oversized structural element. At least two opposing lifts are placement adjacent opposing sides of the element. Each lift includes a base, a tower, an elevator, and an actuator. The tower extending vertically from the base, and the elevator is disposed on the tower. A support extends from the elevator outward from the tower to engage a point on the element. A guide of the elevator is configured to ride along a rail of the tower. The actuator is connected to the elevator and is configured to move with the elevator vertically along the tower. The actuator can include a strand jack disposed on the elevator. Hydraulic operation of the stand jack moves the jack and elevator along a strand extending along the tower. The arrangements of the lifts leave space below the raised element free for access to other operations.

26 Claims, 28 Drawing Sheets

(56) References Cited

U.S. PATENT DOCUMENTS

| | | | |
|---|---|---|---|
| 6,193,219 B1 | 2/2001 | Beiley | |
| 6,368,022 B1 | 4/2002 | Zingerman | |
| H002061 H * | 4/2003 | Tunnell | 410/47 |
| 8,056,681 B2 | 11/2011 | Fukuda | |
| 8,083,034 B2 | 12/2011 | Bordwell | |
| 8,579,304 B2 | 11/2013 | Setzer, Sr. | |
| 9,222,277 B2 | 12/2015 | Yustus | |
| 9,249,000 B2 | 2/2016 | Finkbeiner | |
| 9,696,029 B2 | 7/2017 | Boecker | |
| 9,764,934 B2 | 9/2017 | Knapp | |
| 9,834,411 B2 | 12/2017 | Cox | |
| 10,144,625 B2 | 12/2018 | Giattina | |
| 10,183,838 B2 | 1/2019 | Weber | |
| 10,472,095 B1 | 11/2019 | Vance et al. | |
| 2002/0017637 A1 | 2/2002 | Belley | |
| 2005/0031431 A1* | 2/2005 | Wobben | F03D 13/40 410/45 |
| 2005/0123382 A1 | 6/2005 | Christensen | F03D 13/40 414/373 |
| 2006/0213145 A1 | 9/2006 | Haller | |
| 2013/0209203 A1 | 8/2013 | Rafols | |
| 2014/0064870 A1* | 3/2014 | Thomsen | B60P 3/40 410/44 |
| 2014/0193255 A1 | 7/2014 | Hancock et al. | |
| 2014/0259669 A1* | 9/2014 | Busbey | F03D 13/10 29/889.71 |
| 2014/0369779 A1* | 12/2014 | Randall | B60P 3/40 410/44 |
| 2016/0017861 A1* | 1/2016 | Sigurdsson | F03D 13/40 410/45 |
| 2020/0378365 A1* | 12/2020 | Mathew | F03D 13/40 |
| 2021/0053205 A1* | 2/2021 | Zhang | B25H 1/10 |
| 2021/0293223 A1* | 9/2021 | Soerensen | F03D 13/40 |
| 2022/0235741 A1* | 7/2022 | Weiss | F03D 13/40 |
| 2022/0260059 A1* | 8/2022 | Falkenberg | F03D 13/10 |
| 2022/0289098 A1* | 9/2022 | Travers | F03D 13/20 |
| 2023/0258159 A1* | 8/2023 | Poisler | F03D 13/40 410/44 |

FOREIGN PATENT DOCUMENTS

| | | | | |
|---|---|---|---|---|
| CN | 110482434 A | | 11/2019 | |
| CN | 115071894 B | * | 1/2024 | B63B 27/16 |
| EP | 3219983 A1 | | 9/2014 | |
| EP | 2939933 A1 | | 11/2015 | |
| EP | 1558464 B1 | | 8/2018 | |
| EP | 3090171 B1 | | 4/2019 | |
| EP | 3620393 A1 | | 11/2020 | |
| EP | 3882458 A1 | * | 9/2021 | B66C 1/46 |
| JP | 4913847 A | | 2/1974 | |
| JP | H05311762 A | | 11/1993 | |
| JP | 3219983 U | * | 1/2019 | |
| KR | 101153779 B1 | | 6/2012 | |
| WO | 98/52860 A1 | | 11/1998 | |
| WO | 2014/186868 A1 | | 11/2014 | |

OTHER PUBLICATIONS

Doorman Long Technology, "DL-TLG200 Telescopic Lifting Gantry," undated, downloaded from www.dormanlongtechnology.com on May 4, 2021, 6-pgs.

Doorman Long Technology, "DL-TLG400 Telescopic Lifting Gantry," undated, downloaded from www.dormanlongtechnology.com on May 4, 2021, 7-pgs.

Doorman Long Technology, "DL-TLG600 Telescopic Lifting Gantry," undated, downloaded from www.dormanlongtechnology.com on May 4, 2021, 7-pgs.

Doorman Long Technology, "DL-TLG1200 Telescopic Lifting Gantry," undated, downloaded from www.dormanlongtechnology.com on May 4, 2021, 7-pgs.

Doorman Long Technology, "Pinned Climbing & Skidding Jacks, Hydraulic Power Units and Control Systems," undated, downloaded from www.dormanlongtechnology.com on Sep. 28, 2022, 20-pgs.

International Search Report issued Sep. 15, 2022, in counterpart PCT Application No. PCT/US2022/031981.

"ALE Deploys Mega Jack 300 in Kuwait." Heavy Lift & Project Forwarding International Magazine, Oct. 24, 2018. www.ale-heavylift.com (http://www.ale-heavylift.com) (4 pages).

"ALE Expands Mega Jack 300 Fleet and Capabilities in Europe." Crane Network News, Nov. 19, 2018. https://cranenetworknews.com/ale-expands-mega-jack-300-fleet-and-capabililties-in-europe/ (4 pages).

"ALE Increasing Jacking Capacity to Over 100,000T." Breakbulk.news. Feb. 15, 2018. https://breakbulk.new/ale-increase-jacking-capacity-100000t/ (4 pages).

Mammoet, "SSL30 Strand Jack, Lifting Block Dimensions and Specifications." Version 1, Nov. 6, 2015, SAP No. 4000116254. (1 page).

Dorman Long Technology Limited. "DL-P40 Release 3.029.xx Computer Control System." Operation and Maintenance Manual. v3, rev. 3.029, pp. 1-54 (54 pages).

ALE, "Equipment Data Sheet—500te Climbing Jack." Issue 1. www.ale-heavylift.com. https://www.ale-heavylift.com_wp-content_uploads_2014_01_Equipment-Data-Sheet-500te-Climbing-Jack.pdf (1 page).

ALE, "Equipment Data Sheet—Mega Jack System MJS5200." Issue 1. www.ale-heavylift.com. https://www.ale-heavylift.com_wp-content_uploads_2014_01_Equipment-Data-Sheet-Mega-Jack-System.pdf (3 pages).

ALE, "Equipment Data Sheet—500te Screwed Locking Collar Jack." Issue 1. www.ale-heavylift.com. https://www.ale-heavylift.com_wp-content_uploads_2014_01_Equipment-Data-Sheet-SLT-Jacks.pdf (1 page).

ALE, "ALE Mega Jack 300 System." www.ale-heavylift.com. https://www.ale-heavylift.com_wp-content_uploads_2018_03_Data-Sheet.pdf (1 page).

* cited by examiner

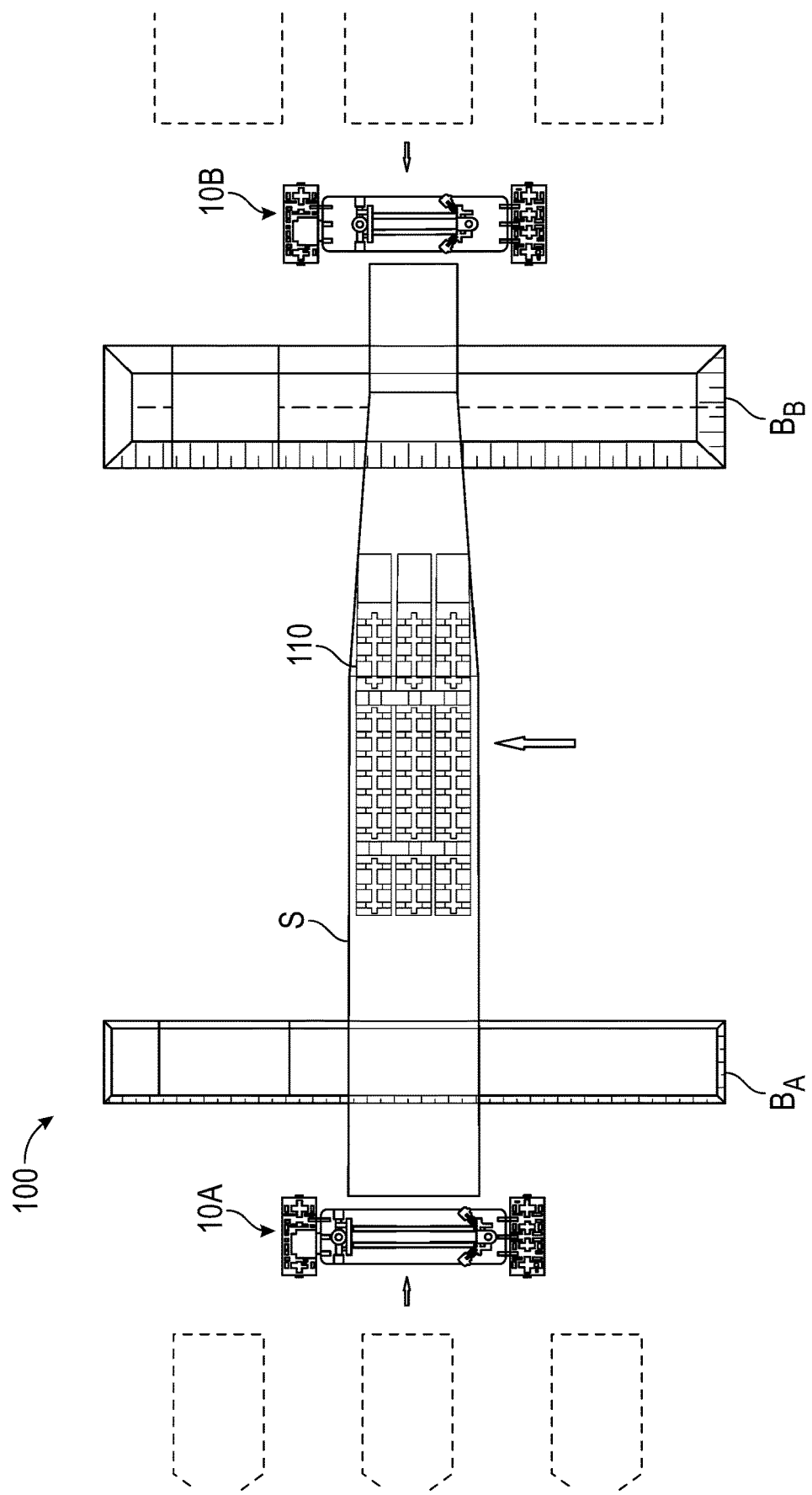

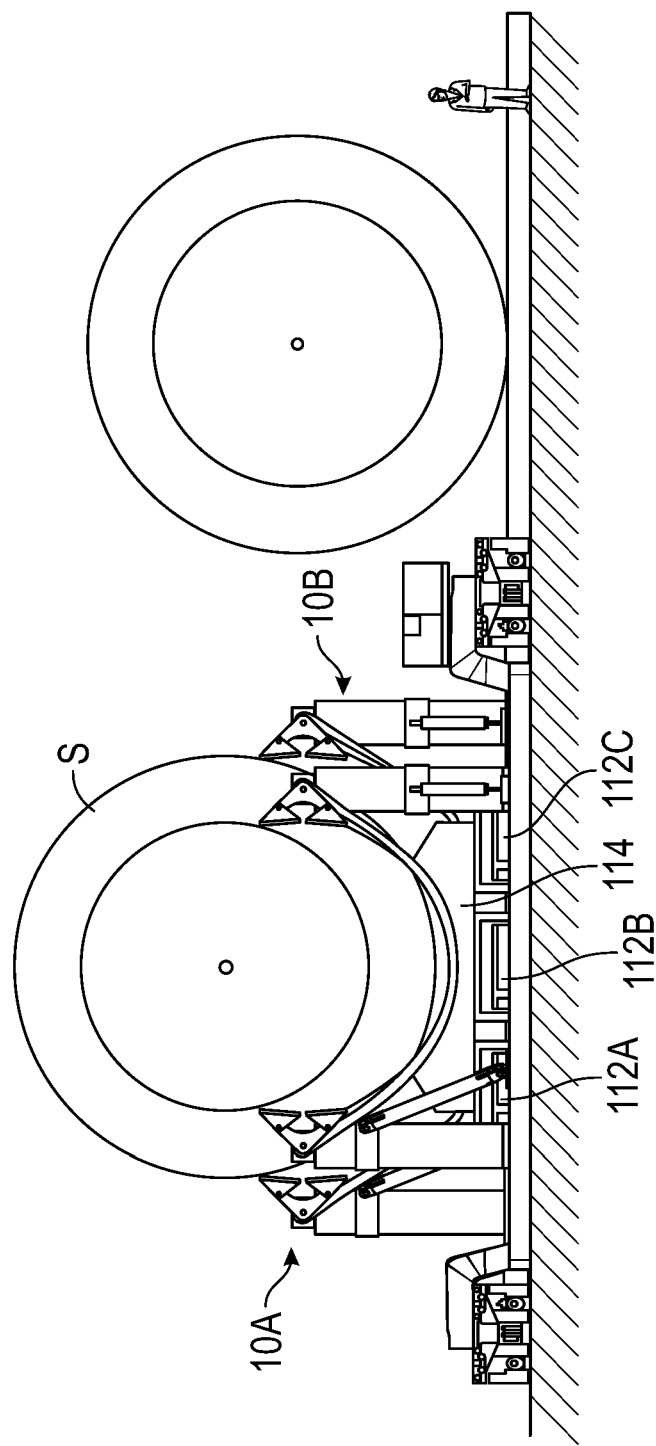

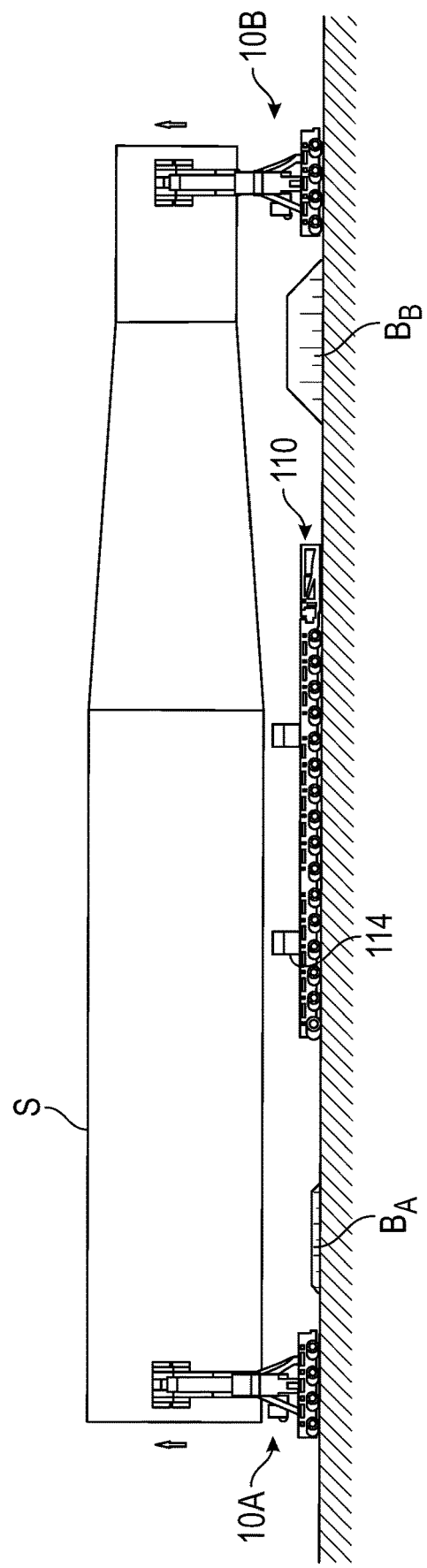

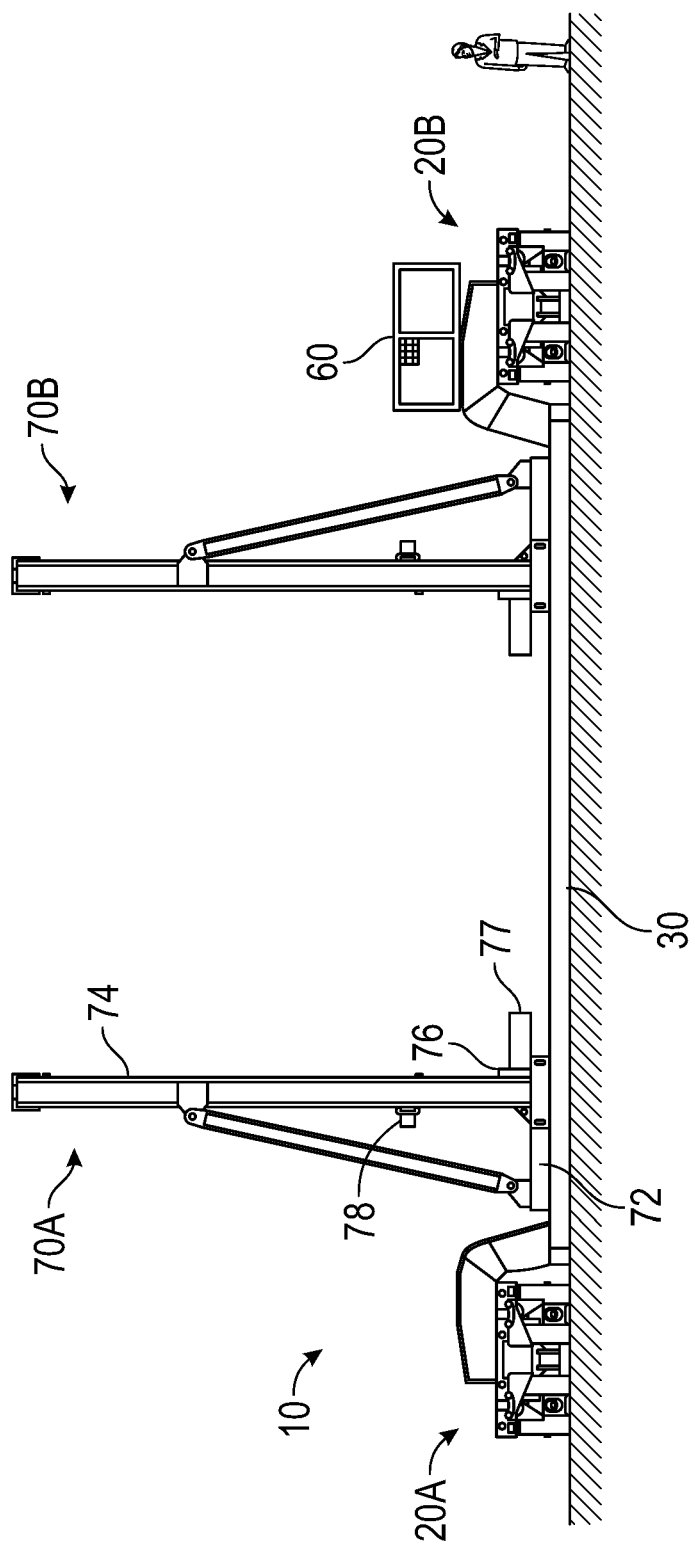

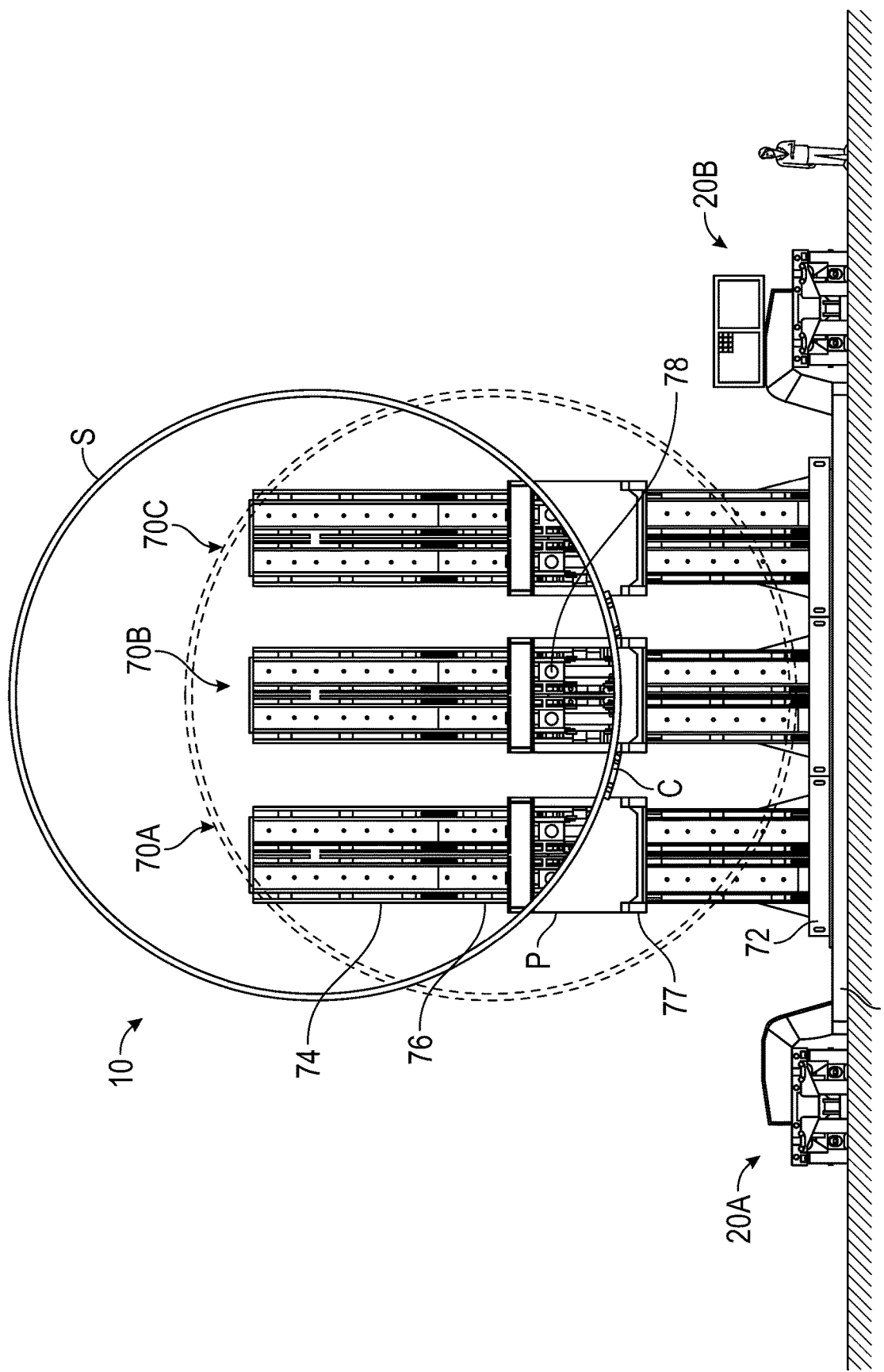

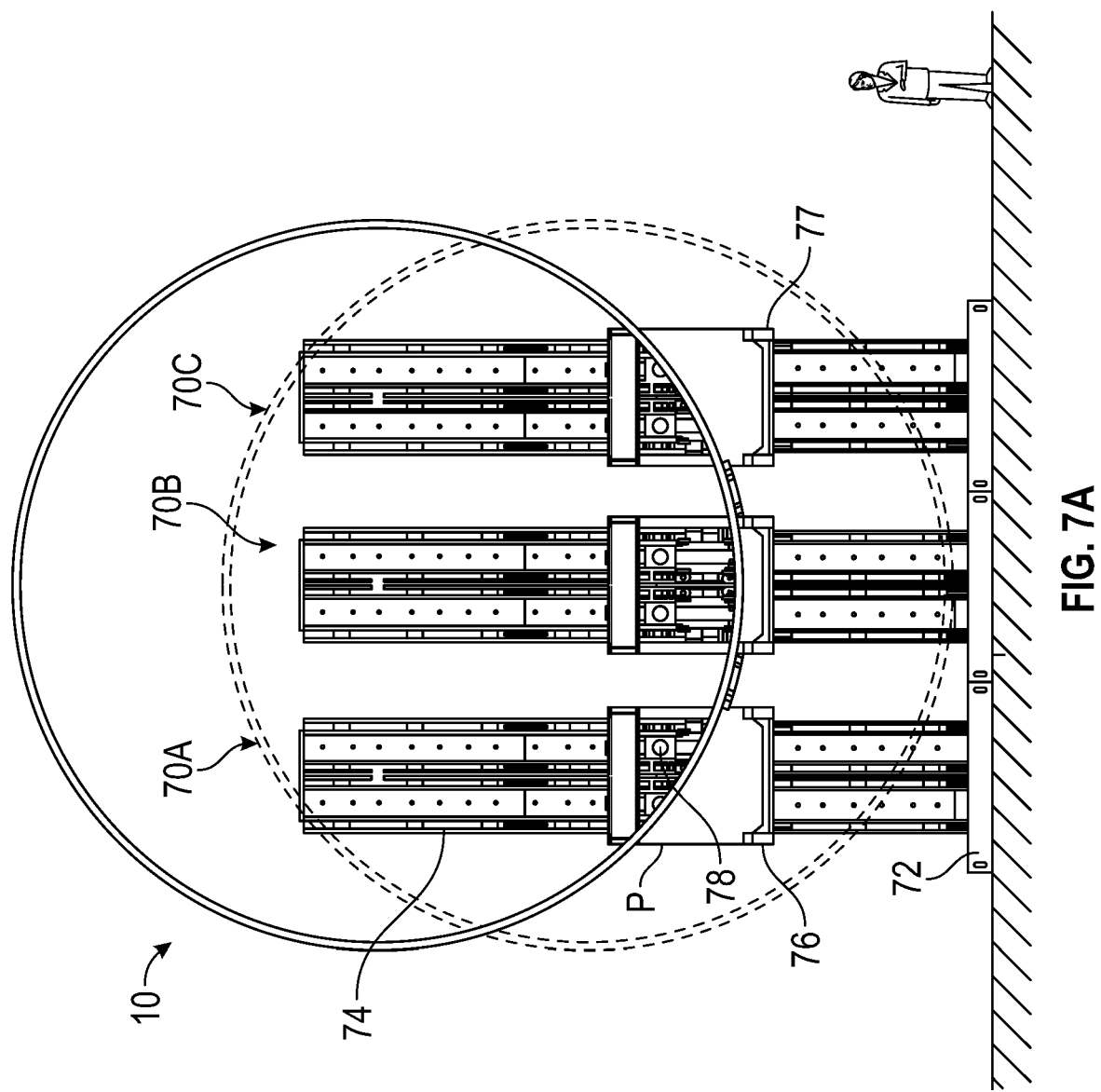

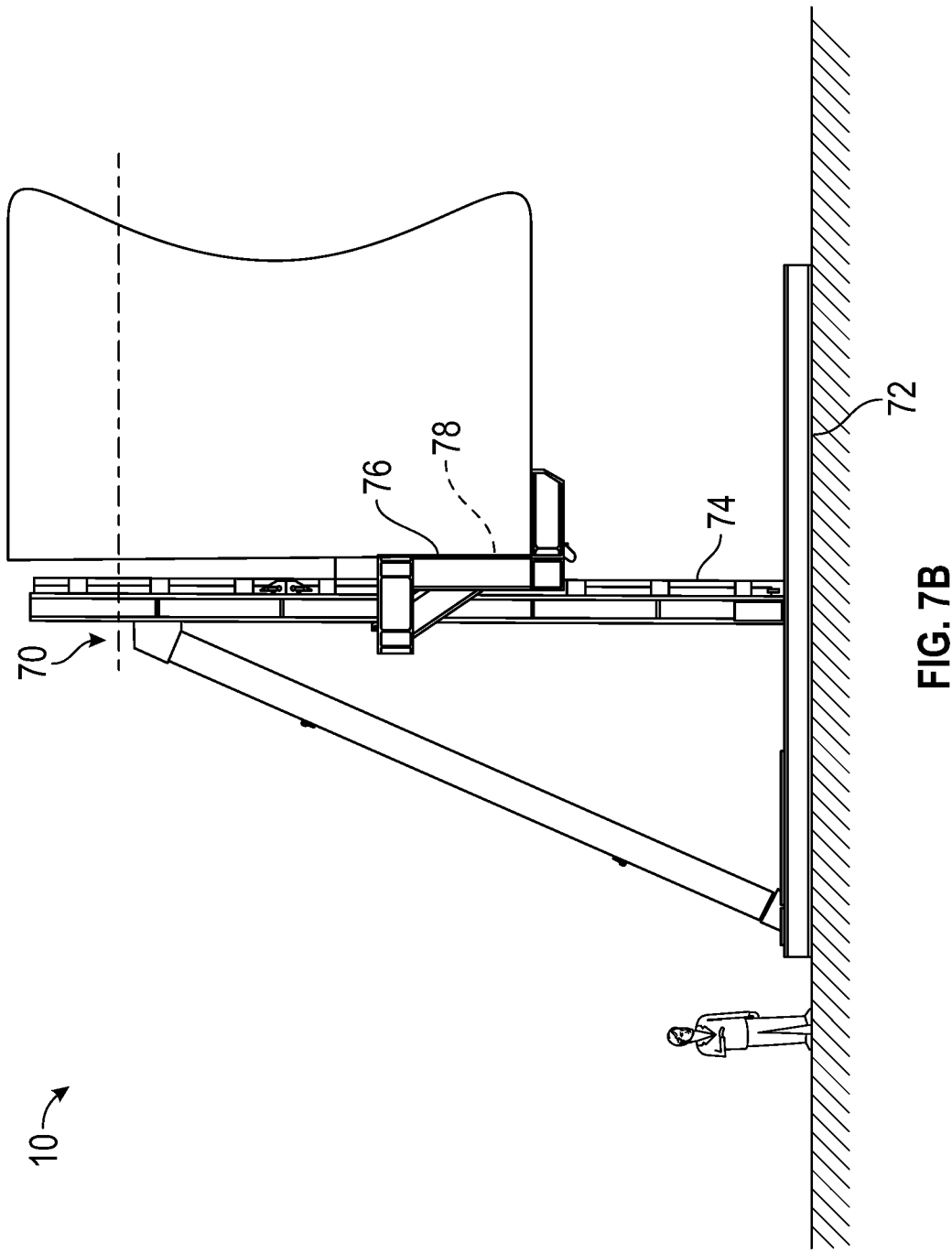

LIFT SYSTEM AND METHOD FOR WIND TURBINE MONOPILES AND OTHER STRUCTURES

BACKGROUND OF THE DISCLOSURE

Various types of equipment can be used to lift extremely heavy loads. Lifting can be done using boom cranes, gantry cranes, and jack-up systems. One type of heavy, oversized load that requires transport and lifting includes monopiles, which are used for offshore windmill installations. The monopile is typically several tens of meters in length, has a cylindrical shape, and weighs at least 400 to 3000 tons. The monopile is composed of steel and is driven an embedment depth (10 to 20 meters) into the seabed offshore to provide a foundation for a wind turbine tower. Overall, the length of the monopile, its diameter, wall thickness, and other details depend on the installation.

An offshore wind farm can having hundreds of structures so handling and transporting the structures can be involved. In the process of installing offshore wind turbines, the monopiles can be stored in a staging area. The monopile is placed on self-powered mobile transports having saddles to support the monopile so the transports can drive the monopile to sand or gravel bunds or other blocking arrangement for laydown. Because the monopile needs to be lifted above the sand bund, the transports need to be initially raised so the monopile clears the height of the sand bunds. Once in position, the transports then need to be lowered to set the monopiles on the sand bunds. Yet, the transports may need to lower even further so the transports and the saddles they support can drive clear from underneath the monopile resting on the sand bunds. Otherwise, the saddles must be disassembled so the transports can drive clear of the resting monopile. The increased height of the sand bunds needed in the staging area for this form of transportation and laydown of the monopiles require extensive work and preparation to arrange. The size of the sand bunds or blocking depends on the allowable ground loading capacity. Also, the height and weight adds to the total weight which needs to be distributed.

Other than monopiles, other types of structural elements may need to be transported in a similar manner to be set on sand bunds, falsework, or other supports at a staging area. What is needed is a way to transport, raise and lower such heavy, oversized loads so they can be closer to the ground and require surrounding support with lower profiles.

The subject matter of the present disclosure is directed to overcoming, or at least reducing the effects of, one or more of the problems set forth above.

SUMMARY OF THE DISCLOSURE

An apparatus disclosed herein is used in moving a load from one location to another location. The load is heavy and oversized and has opposing sides. The apparatus comprises a transport, at least one lift, and at least one actuator. The transport has a bed and is mobile. The transport is configured to raise and lower the bed relative to the ground. The at least one lift is disposed on the bed for placement adjacent the load. The at least one lift comprises a support configured to support a portion of the load. The at least one actuator is associated with the at least one lift and is configured to raise and lower the support on the at least one lift relative to the bed.

A system disclosed herein for moving a heavy oversized load comprises: a pair of the apparatus discussed above for arrangement at opposing ends of the load.

A method is disclosed herein for moving a load that is heavy and oversized. The method comprises: transporting the load to a destination having structural supports by carrying the load on one or more self-powered mobile transports; arranging mobile lift units at opposing ends of the load at the destination; lifting the load relative to the ground by operating the mobile lift units at the opposing ends; supporting the lifted load with the mobile lift units while removing the one or more self-powered mobile transports from under the lifted load; and lowering the load onto the structural supports by operating the mobile lift units at the opposing ends.

The foregoing summary is not intended to summarize each potential embodiment or every aspect of the present disclosure.

BRIEF DESCRIPTION OF THE DRAWINGS

FIGS. 3A-3C illustrate plan, elevational, and end views of the disclosed lift unit in a first stage of moving a structural element.

FIGS. 4A-4C illustrate plan, elevational, and end views of the disclosed lift unit in a second stage of moving the structural element.

FIGS. 5A-5B illustrate elevational view of another lift unit of the present disclosure in the lowered and raised states.

FIG. 6A-6B illustrate a front elevational view and a plan view of another lift unit.

FIG. 7A-7B illustrate a front elevational view and a side view of yet another lift unit.

DETAILED DESCRIPTION OF THE DISCLOSURE

A lift unit and a lift system having lifts according to the present disclosure are used for lifting (raising/lowering) very heavy and large loads, which can include, but are not limited to structures or structural elements (e.g., a monopile for an offshore windmill, a Floating Production Storage and Offloading (FPSO) module, a pipe rack module, a bridge component, etc.), equipment or equipment components (e.g., a ship, a processing vessel, a reactor drum, a transformer skid, a shovel used in mining industry, etc.), or any other very heavy and large load weighing tens to hundreds of tons. (As disclosed herein, the terms "load", "structural element", "module," and the like may be used interchangeably.) As typical, such structures, elements, equipment, loads, and the like may be pre-assembled at one location and then transported to another location for staging and eventual installation at a site.

As will be appreciated with the benefit of the present disclosure, the lift units and the lift system disclosed herein can be used in a number of applications for lifting loads. As one example, a monopile is typically constructed at one location and is then transported by boat, barges, and other transport to a staging area for eventual integration into an offshore site. The lift units and lift system disclosed herein can lift such monopile from near ground level so transports can be moved under the lifted monopile, which can then be lowered onto the transports. Additionally, the lift units and lift system disclosed herein can lift the monopile from the transports so the transports can be removed under the lifted monopile, which can then be lowered to near ground level.

In the construction of offshore windmills, for example, a monopile is assembled at a location away from a construction site, and the monopile is then delivered by a vessel or barges to the project's construction dock. Dock cranes can be used to move the monopile from the vessel to mobile transports, such as Self-Propelled Mobile Transports (SPMTs) used for transporting very large and heavy loads. The monopile is subsequently transported on the mobile transports to a staging area. The lift units and lift system disclosed herein can lift such monopiles in ways not available with conventional systems. In the end, the lift units and lift system can reduce the amount of sand/gravel required at a staging area for laydown of monopiles and can allow the monopiles to be supported at a lower height.

Figure 1A:
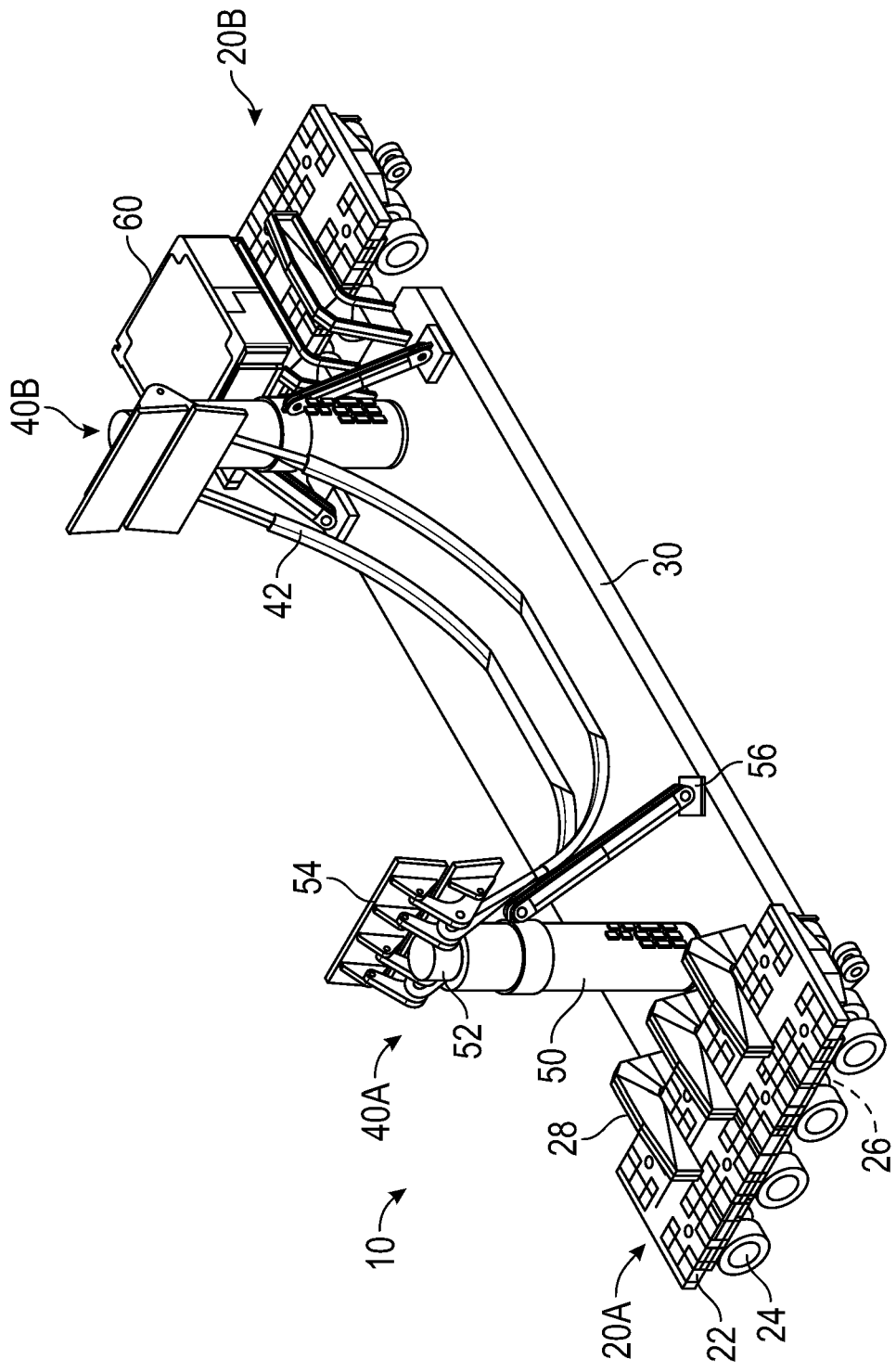
FIGS. 1A-1B illustrate perspective views of a lift unit according to the present disclosure in a lowered state and a raised state.
Figure 1B:
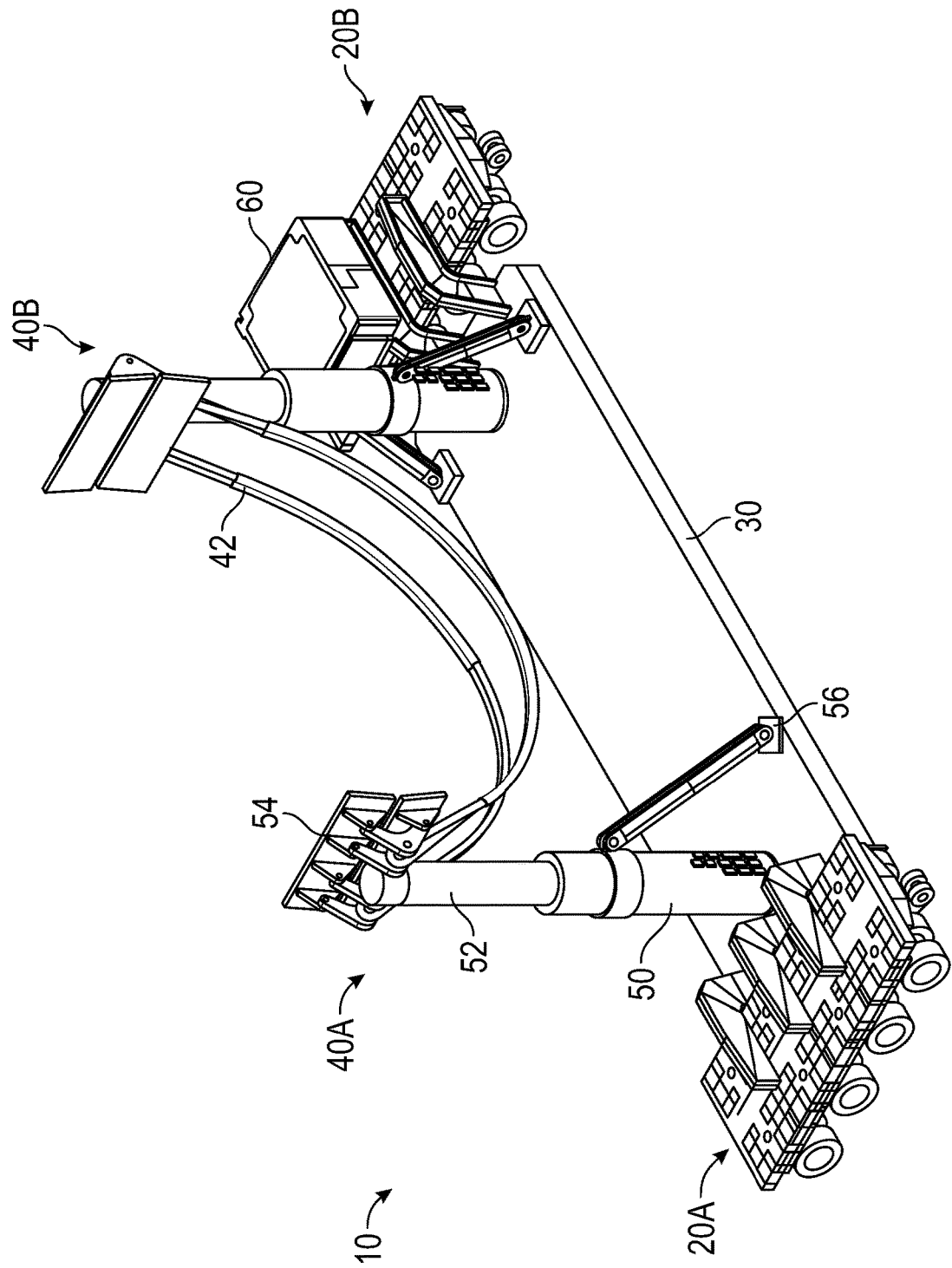
Figure 1C:
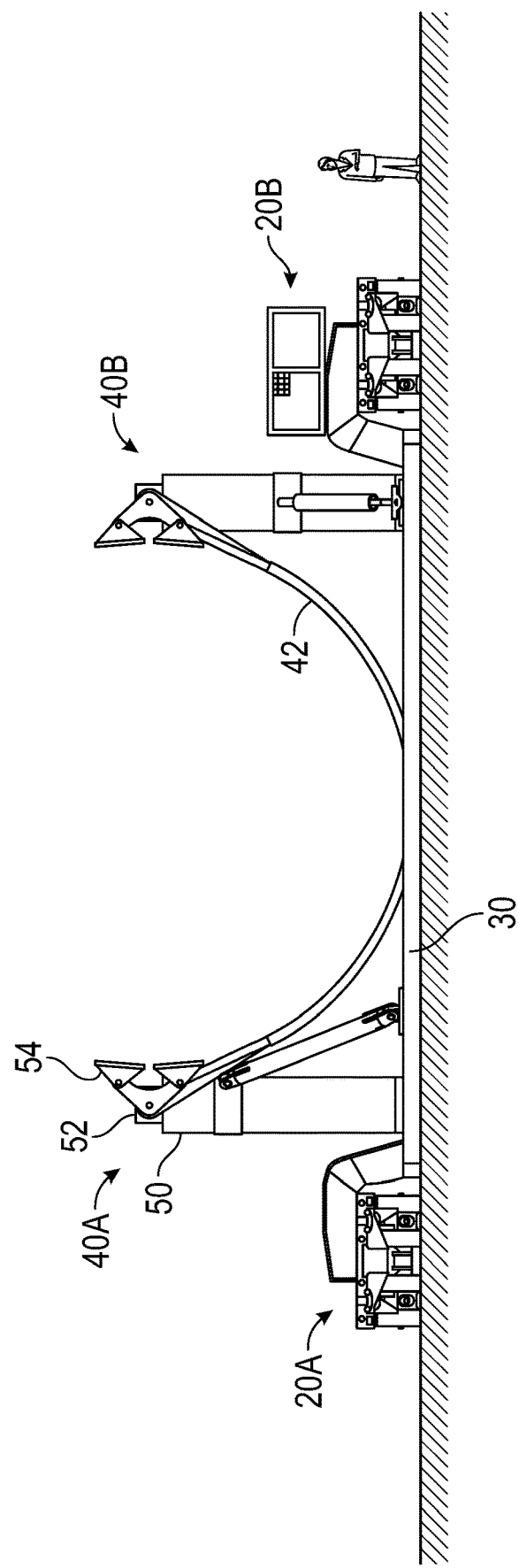
FIGS. 1C-1D illustrate elevational views of the disclosed lift unit in the lowered and raised states.
Figure 1D:
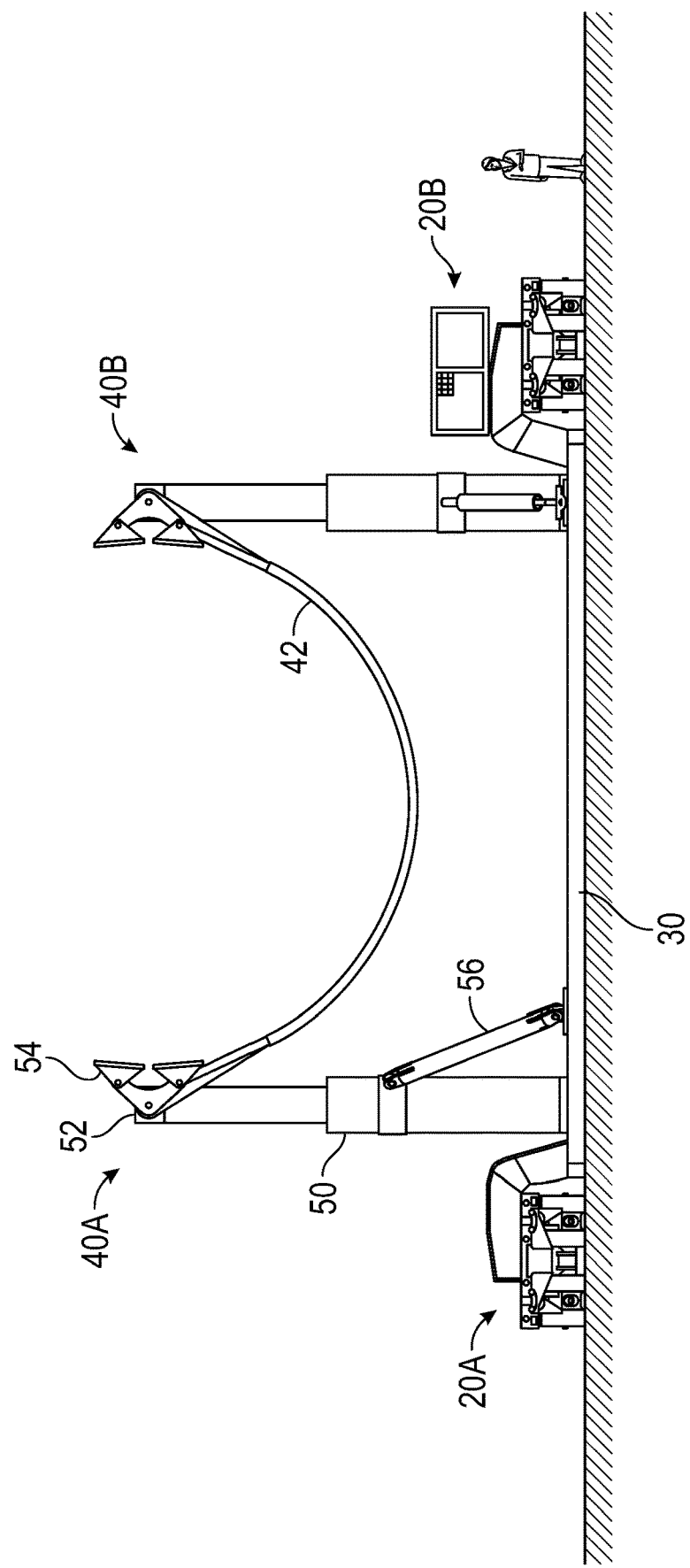
Figure 1E:
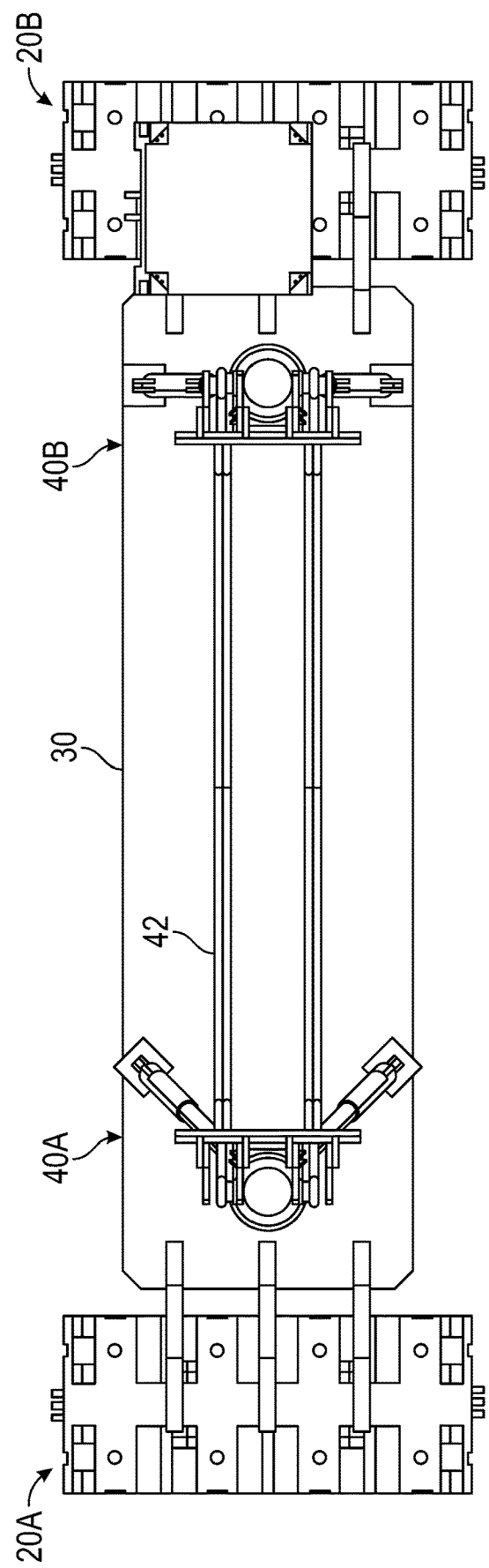
FIG. 1E illustrates a plan view of the disclosed lift unit.

Having an understanding of the lift units and lift system of the present disclosure, discussing turns to particular configurations. FIGS. 1A-1B illustrate perspective views of a lift unit 10 according to the present disclosure in a lowered state and a raised state, and FIGS. 1C-1D illustrate elevational views of the disclosed lift unit 10 in the lowered and raised states. FIG. 1E illustrates a plan view of the disclosed lift unit 10.

The lift unit 10 is used with other lift units 10 for handling a heavy, oversized load that is moved from one location to another, such as to a staging area. As discussed below, the load can be a structural element, such as a cylindrical monopile for an offshore wind turbine, but other structural elements can benefit from lifting by the disclosed lift unit 10. The lift unit 10 is mobile, being configured to move or be moved. In the present configuration, the lift unit 10 includes a transport unit having a bed 30. As shown here, the transport unit includes a pair of self-powered mobile transports 20A-B with the bed 30 connected between them. During operation, the mobile transports 20A-B can move the bed 30 in position and can raise and lower the bed 30 relative to the ground. Although two mobile transports 20A-B are shown here arranged side-by-side with the bed 30 therebetween, more mobile transports can be used. Additionally, if practical, one mobile transport 20 can be used.

Opposing lifts 40A-B are disposed on the bed 30 so the lifts 40A-B can be positioned adjacent opposing sides at an end of the load. Each of the lifts 40A-B includes a support 54 configured to engage one of the opposing sides of the load. At least one actuator unit 60is associated with the opposing lifts 40A-B and is configured to raise and lower the supports 54 on the lifts 40A-B relative to the bed 30.

As shown here, the mobile transports 20A-B are disposed side-by-side and have the bed 30 connected between them. Each of the mobile transports 20A-B has a chassis 22 having single-axel wheel sets 24, which are powered for mobility on the ground. Each mobile transport 22 also includes a lift mechanism (26) configured to raise and lower the chassis 22 relative to the wheel sets 24 on which the chassis 22 is supported. In general, the mobile transport 20A-C can be similar to Self-Propelled Mobile Transports (SPMTs) used for transporting very large and heavy loads. Each chassis 22 is connected to one end of the bed 30. For example, rails or ribs 28 can connect between the top of the chassis 22 and the end of the bed 30.

The actuator unit 60 on the lift unit 10 can provide power and control of the opposing lifts 40A-B. According to the present embodiment, each of the opposing lifts 40A-B comprises a telescopic hydraulic cylinder 50 extending vertically from the bed 30. Thus, the actuator unit 60 can include one or more hydraulic pumps and one or more hydraulic storage tanks for communicating hydraulic fluid with the cylinders 50. As shown here, the actuator unit 60 can be shared between for the two lifts 40A-B, or each lift 40A-B can have a dedicated actuator unit 60. Although the lifts 40A-B can include telescoping hydraulic cylinders 50, other lifts can be used as discussed in other embodiments.

In general, the telescopic hydraulic cylinder 50 includes a base stage supported on the bed 30 and includes at least one ram stage 52 extending from the base stage. In the present example, one ram stage 52 is provided, but more can be used depending on the height required for lifting. The ram stage 52 has a stroke length when hydraulically actuated, which lifts the support 54 on the distal end.

One or more legs 56 can support the telescopic hydraulic cylinder 50 vertically on the bed 30. To engage cylindrical surfaces, the support 54 can be a cradle connected by a pivotable joint to the distal end of the lift's ram stage 52. Moreover, to support a cylindrical object, at least one sling 42 can be connected between the supports 54 on the opposing lifts 40A-B. In this example, two endless slings 42 are run parallel to one another between the supports 54 to engage a cylindrical surface of a structural element. Instead of slings, radius-formed steel bands can be used as well.

Having a brief understanding of this one type of lift unit 10 of the present disclosure, discussion turns to how such a lift unit 10 can be used in handling a heavy, oversized load, such as a monopile.

Figure 2:
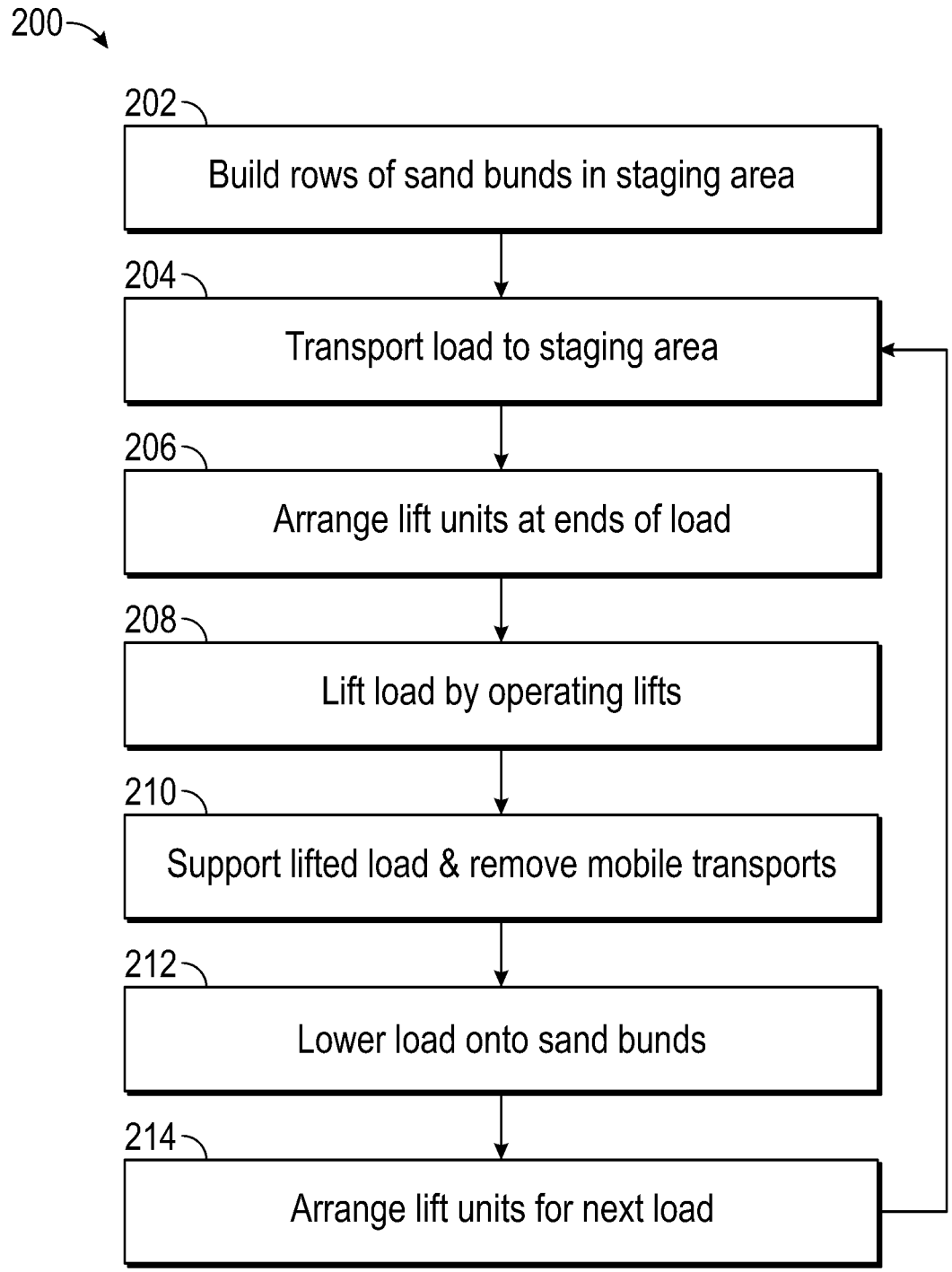
FIG. 2 illustrates a process of lifting a heavy, oversized load with the disclosed lift system.
Figure 3B:
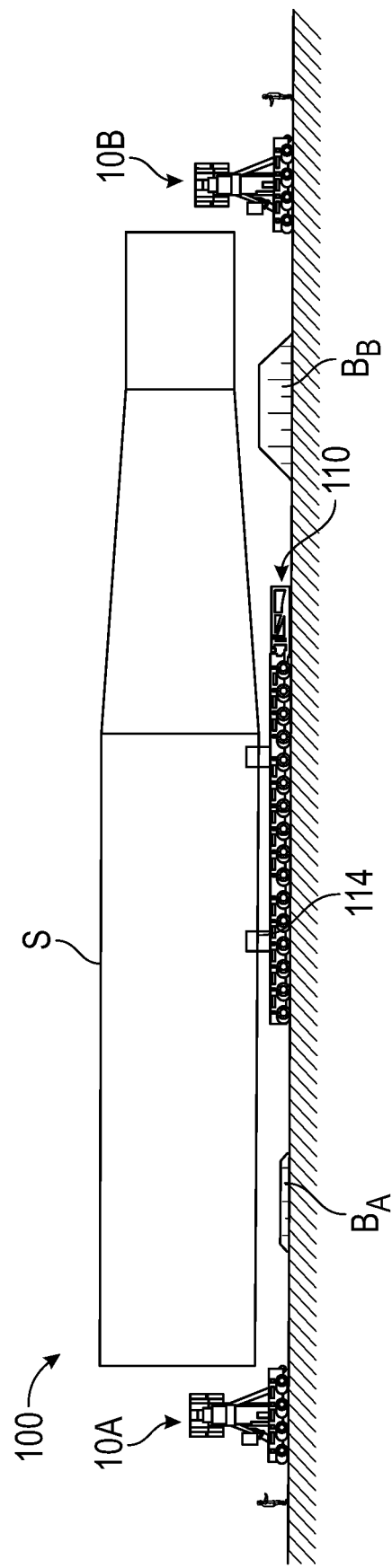

FIG. 2 illustrates a process 200 of lifting a heavy, oversized load with a lift system having lift units. The process 200 described here can apply to the lift unit 10 disclosed above as well as other configurations for the lift units disclosed herein. In the present example, the heavy, oversized load can be a monopile for an offshore wind turbine, which can weight up to 1000 tons or more and can be about 70-m in length. Other structural elements can be moved using the configurations and method disclosed herein.

Initially, at a staging area, operators setup structural supports, falsework, or the like (Block 302). For laydown of large monopiles, for example, operators build rows of sand or gravel bunds or berms. The load is then transported to the staging area by carrying the load on one or more mobile transports (Block 304). Lift units 10 are then arranged at opposing ends of the load at the staging area (Block 306), and the load is lifted relative to the ground by operating the lift units 10 at the opposing ends (Block 208). While the lifted load is supported with the lift units 10, the one or more mobile transports are removed from under the lifted load so they can be used to transport another load to the staging area (Block 210).

With the space below the load clear, the load is then lowered onto the structural supports by operating the lift units 10 at the opposing ends (Block 212). With the load laid down, the lift units 10 can then be arranged for the next load being transported to the sand bunds at the staging area (Block 214). The process 200 can then be repeated as needed. As will be appreciated, the loads at the staging area may then be handled as required. For offshore monopiles that will be part of an offshore wind farm, the monopole can be lifted by a crane and installed on a vessel or barge for installation offshore.

To illustrate this process with respect to the disclosed lift unit 10 of FIGS. 1A-1E, FIGS. 3A-3C illustrate plan, elevational, and end views of a lift system 100 having opposing ones of the disclosed lift unit 10 in a first stage of moving a structural element, such as the depicted monopile S. In general, the monopile can be placed on mobile transports 110 for transport between the sand bunds $B_{A-B}$ at the staging area. The lift units 10A-B are then used to lift the monopile form the mobile transports 110 and to then set the monopile S on the sand bunds or other matting $B_{A-B}$ at the staging area once the mobile transports 110 are moved. Because the sand bunds $B_{A-B}$ can have lower profiles for the reasons discussed previously, the monopile S can be transported on the mobile transports 110 without any significant raising by falsework and saddles 114. Instead, low-profile falsework and saddles 114 on the transports 110 can be used. Also, transportation of the monopile S closer to the ground may be more stable or more practical under the circumstances.

The lift system 100 is modular and can be arranged and scaled to meet the required support of the structural element S. Here, the structural element S is shown as a monopile, but the system 100 can be used to lift any other suitable structure, module, and the like. Each lift unit 10A-B may have stroke length of 3-m (more or less) to lift the monopile S a desired height above the ground. Each lift unit 10A-B can be configured with a suited capacity (e.g., 1250 ton capacity. For a given project, several monopiles S may be delivered to the site. The lift system 100 of the present disclosure can be used to lift these monopiles S and other loads where space is restricted or congested.

To move the monopile to the staging area, operators first build an arrangement of parallel sand bunds or berms $B_{A-B}$. Each row of sand bunds $B_{A-B}$ may have a lower profile bund $B_A$ to support the larger diameter of the monopile S and a higher profile bund $B_B$ to support the reduced diameter of the monopile S. Using the lift units 10A-B of the present disclosure and the techniques disclosed herein, the heights of these bunds $B_{A-B}$ is not as great as conventionally required, as will be made clear below.

The monopile S is transported to the staging area by carrying the monopile S on one or more mobile transports 110. Due to the size of the monopile S, parallel rows 112A-C of mobile transports 110 are preferably used, and saddles 114 arranged across the rows 112A-C of mobile transports 110 support the cylindrical surfaces of the monopile S.

In heavy transport, such a long and heavy structure like the monopile S needs to be transported on multiple rows 112A-C of the mobile transports 110. Arranging several rows 112A-C of the mobile transports 110 side-by-side creates a wider loading platform ensuring stability of the load during transport and enhancing safety. In general, each of the mobile transports 110 or SPMT units includes a power pack unit ("PPU") and a trailer unit having longitudinal columns, each having a plurality of single axle wheel sets.

Once the monopile S is in position with its ends placed over the sand bunds $B_{A-B}$, the lift units 10A-B are arranged at the opposing ends of the monopile S. The beds (30) of the lift units 10A-B are positioned partially under the ends of the monopile S so that the opposing lifts (40A-B) align with opposing sides at the end of the monopile S. The beds 30 of the lift units (40A-B) are then placed on the ground by lowering the mobile units (20A-B).

As will be appreciated, different arrangement of the lift units 10A-B around the load are possible depending on the size and shape of the load. The type, size, shape, and other factors of the load will dictate the arrangement, number, etc. of the lift units 10A-B, lifts (40A-B), and the like of the system 100, as will be appreciated.

With the lift units 10A-B arranged, the monopile S is lifted relative to the ground and lifted off the saddles 114 of the mobile transports 110 by operating the lift units 10A-B at the opposing ends. The lifts (40A-B) on the units 10A-B are operated simultaneously and independently, and the supports (54) of the lifts (40A-B) are engaged at points on the ends of the monopile S (Block 308). With the lift system 100 ready to take the load of the monopile S, the lift system 110 brings the monopile S off of the mobile transports 110 and raises the monopile S to a desired height (Block 310).

In lifting the ends of the monopile S, the supports (54) of the opposing lifts (40A-B) are engaged at the opposing ends the load, and the opposing ends of the load are lifted by operating each of the opposing lift units 10A-B arranged on the opposing sides. In this particular example, the telescopic hydraulic cylinder (50) of each lift (40A-B) is operated to move the support (54), sling (42) and the like.

Figure 4A:
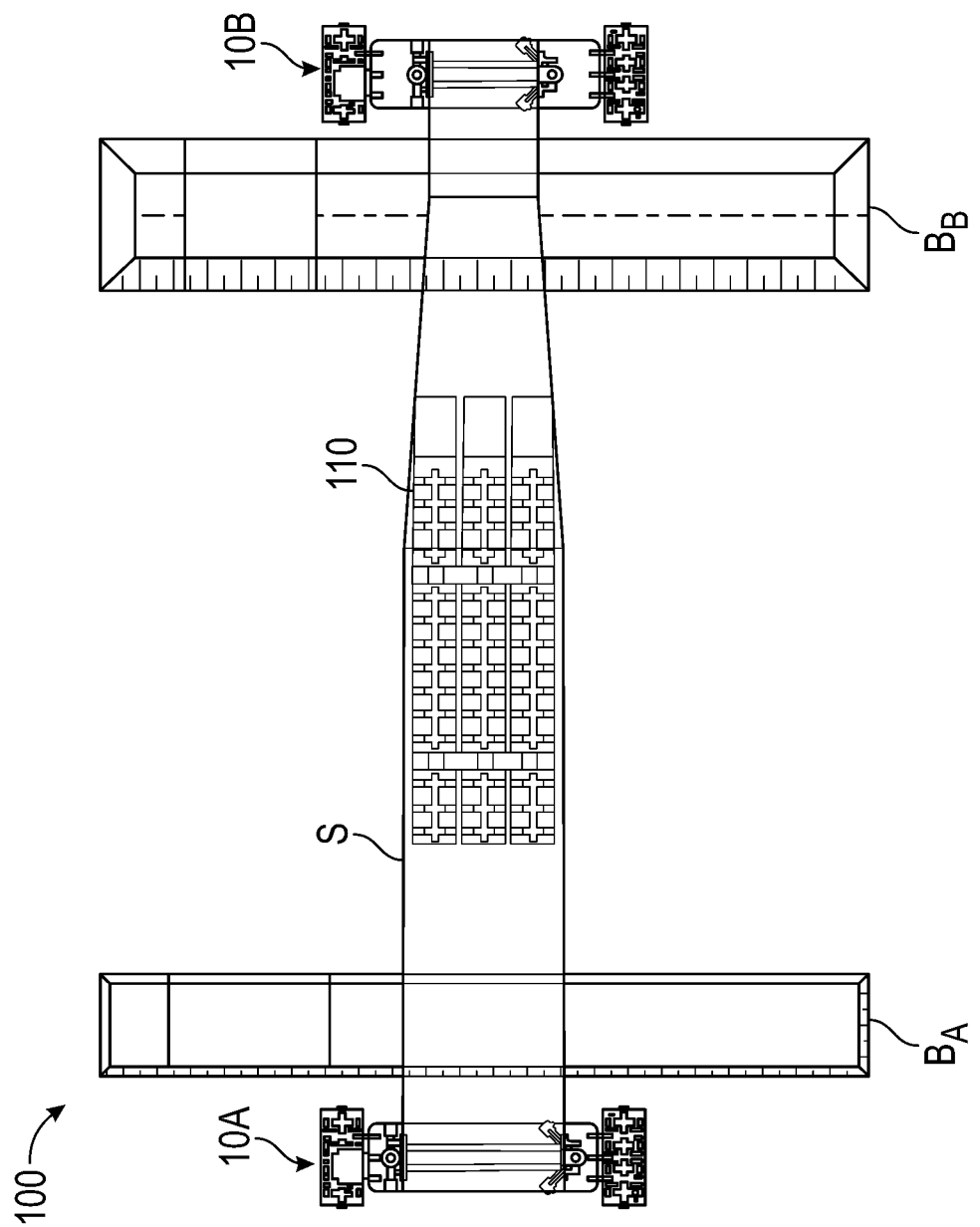
Figure 4C:
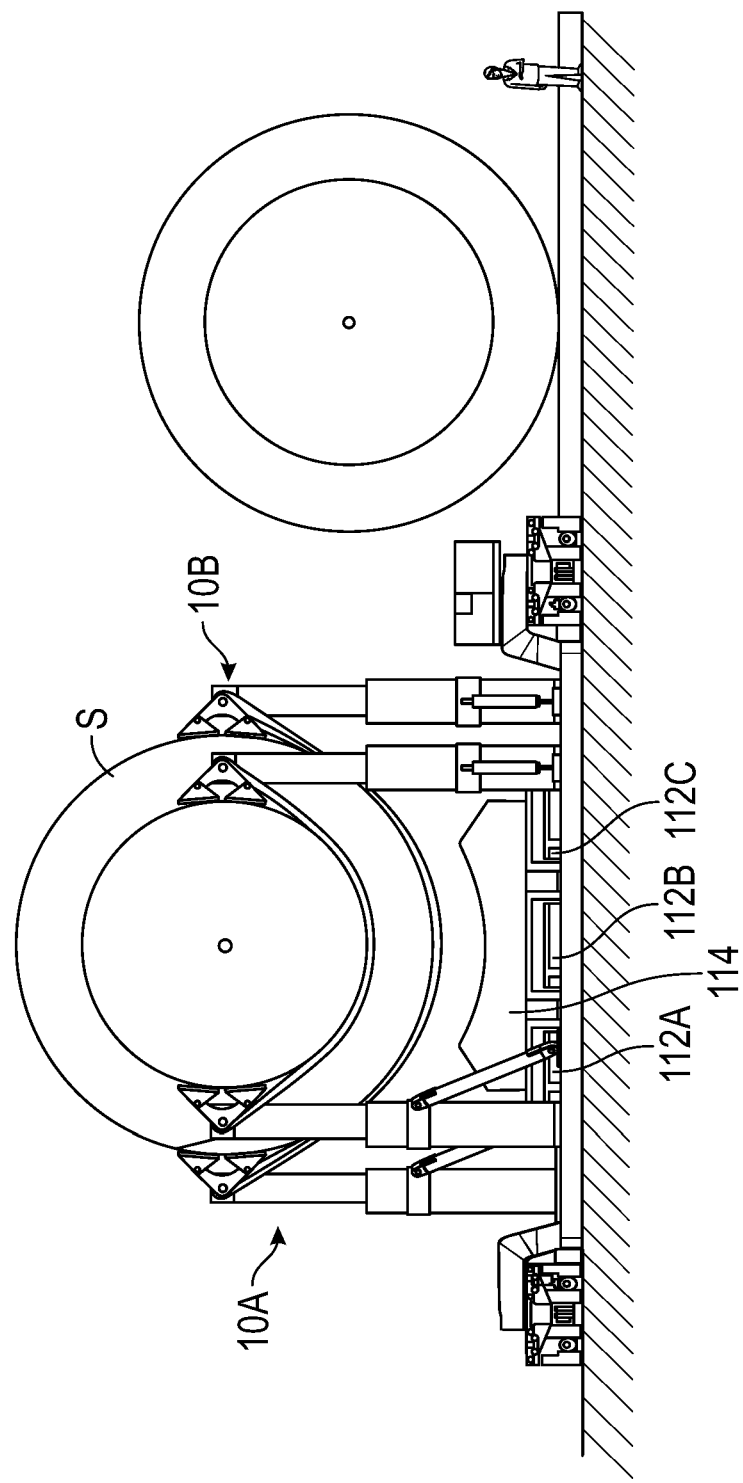

Then, as shown in FIGS. 4A-4C, the lift units 10A-B supporting the monopile S allow the mobile transports 110 to be removed from underneath. Due to the lifted height of the monopile S, the saddles 114 can be passed from under the monopile S while remaining on the transports. Once the mobile transports 110 are removed, the monopile S is lowered onto the sand bunds $B_{A-B}$ by operating the lift units 10A-B at the opposing ends. As can be seen, the sand bunds $B_{A-B}$ with their low profiles require less sand to be built up because the lift units 10A-B of the present disclosure can lift the monopile S a sufficient height and can lower the monopile S lower to the ground when done.

Figure 5B:
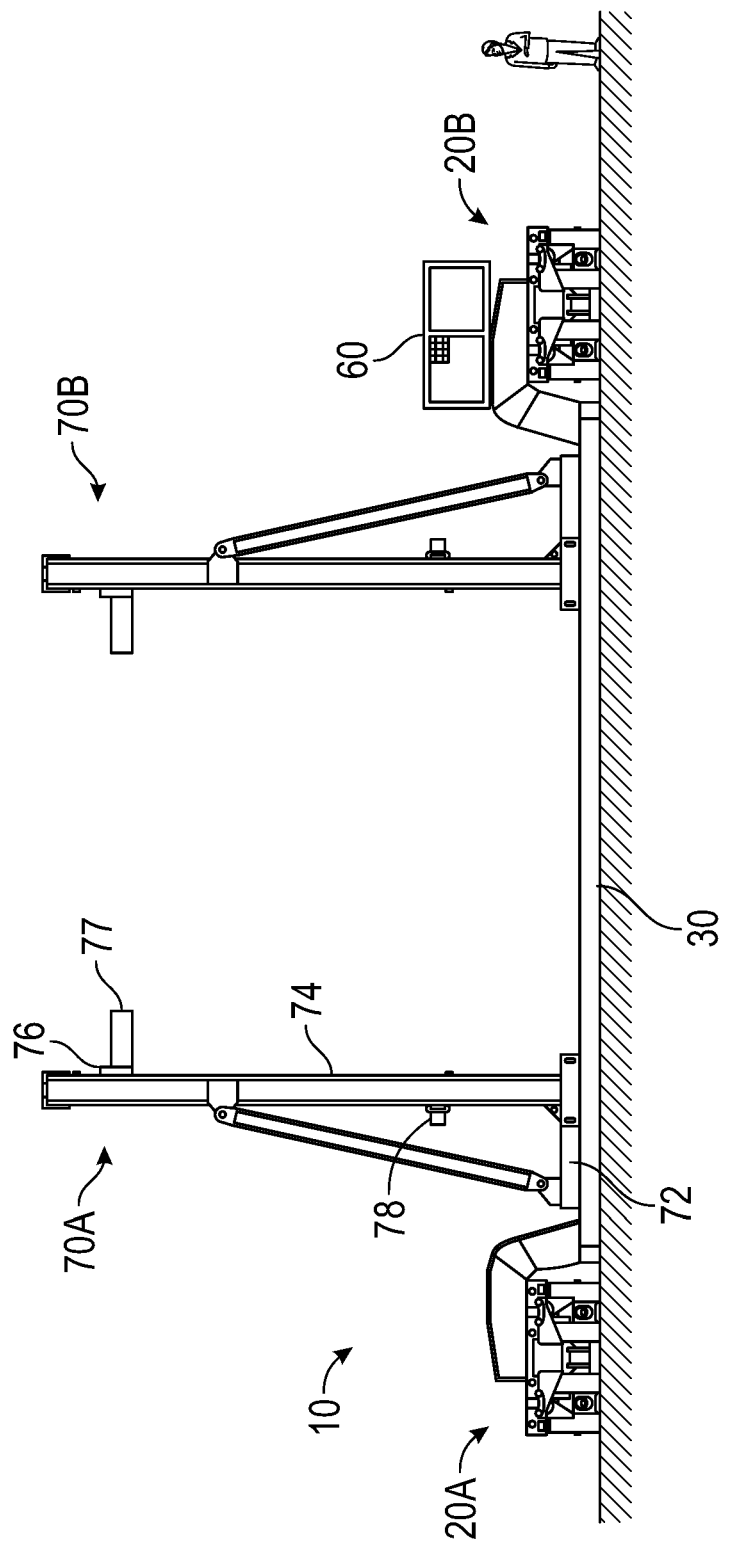
Figure 5C:
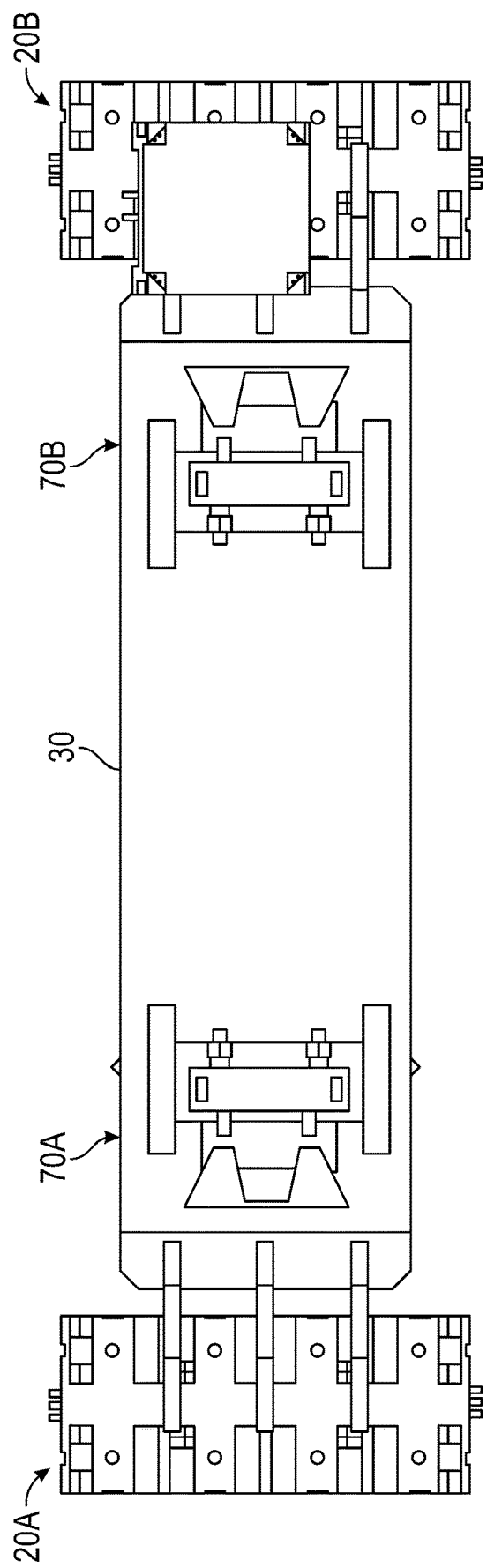
FIG. 5C illustrates a plan view of the disclosed lift unit.

In the previous example, the opposing lifts 40A-B on the lift units 10A-B included telescopic hydraulic cylinders 50. Other lifts can be used. For example, FIGS. 5A-5B illustrate elevational views of another lift unit 10 having lifts 70A-B according to the present disclosure in lowered and raised states. FIG. 5C illustrates a plan view of the disclosed lift unit 10.

As before, the lift unit 10 is mobile, being configured to move or be moved, and opposing lifts 70A-B are disposed on a bed 30 between self-powered mobile transports 20A-B. Other features of the lift unit 10 are similar to those discussed above. In this arrangement, each of the lifts 70A-B includes a tower 74 extending vertically from a base 42. An elevator 76 disposed on the tower 74 has a support 77 extending from the elevator 76 and extending outward from the tower 74. The support 77 is configured to support a portion of a load for lifting (raising/lowering). An actuator 78 on the lift 110 is connected to the elevator 76 and is configured to move the elevator 76 vertically along the tower 74.

As noted, the tower 74 extends vertically from the base 74. The tower has a first guide disposed therealong, such as rails. The elevator 76 disposed on the tower 74 has a second guide, such as rollers engaged in the rails of the tower 74. The support 77 extending outward from the elevator 76 can have forks or other configuration.

The actuator 78 is configured to move the elevator 76 along the tower 74 to lift (raise/lower) the elevator 76 and any load supported by the support 77. In general, the actuator 78 can be a hydraulic or electric actuator that raises and lowers the elevator 76 while maintaining support of the load.

For example, the actuator 78 can be a strand jack mounted on the elevator 76. The strand jack 78 can raise and lower the elevator 76 by climbing along a strand (or bundle of strands) disposed along the tower 74. To do this, the strand jack 78 includes a hydraulic cylinder and a piston disposed between upper and lower clamps through which the strand passes.

Other actuators 78 can be used, including a push-pull jack disposed on the elevator 76, a strand jack mounted on the tower 74, a motor and worm gear arrangement mounted between the tower 74 and elevator 76, or linear hydraulic pistons mounted between the tower 74 and the elevator 76. Each of these actuators 78 are configured to raise/lower the elevator 76 along the tower 74. As before, an actuator unit 60 on the lift unit 10 can provide power and control of the opposing lifts 70A-B. Further details related to this lift 70A-B, the actuators 78 used with the elevator 76, and related elements are disclosed in copending U.S. patent application Ser. No. 16/891,490 filed 3 Jun. 2020 (the '490 application), which is incorporated herein by reference.

The process for moving a heavy, oversized load to a staging area using this lift unit 10 is similar to those discussed previously. In the lift system (100), lift units 10 are arranged at ends of the load, and the beds 30 are lowered to the ground for support. The opposing lifts 70A-B on the units 10A-B lift the load from mobile transports (110), allowing the transports (110) to be removed before the lift units 10A-B then lay down the load onto the sand bunds or the like. Because the load may have a cylindrical shape, the supports 77 can be modified appropriately and a sling can be used. If the load is rectilinear in shape, then the supports 77 as shown can be used. These and other modifications would be appreciated based on the teachings of the present disclosure.

In the previous examples, opposing lifts have been supported on a bed of a lift unit. Other arrangements can be used. For example, FIG. 6A-6B illustrate a front elevational view and a plan view of another lift unit 10 having lifts 70A-C mounted side-by-side on a bed 30.

As before, the lift unit 10 is mobile, being configured to move or be moved, and lifts 70A-C are disposed on a bed 30 between self-powered mobile transports 20A-B. Similar to the previous configuration, each of these lifts 70A-C includes a tower 74 extending from a base 72, and each has an elevator 76 and an actuator 78 that can raise and lower a support 77 along the tower 74. Here, however, the lifts 70A-C are arranged side-by-side to face the same direction. In general, the support 77 can include forks, a platform, or the like extending horizontally from the tower 74. Because the load may have a cylindrical shape as shown with the monopile S here, spacers or adapters P can be used with the supports 77 to saddle the contour of the load. As further shown, couplings C in the form of slings, absorbers, dampers, or the like can be hingedly connected between the adapters P to provide a further support area under the end of the monopile S.

Figure 6B:
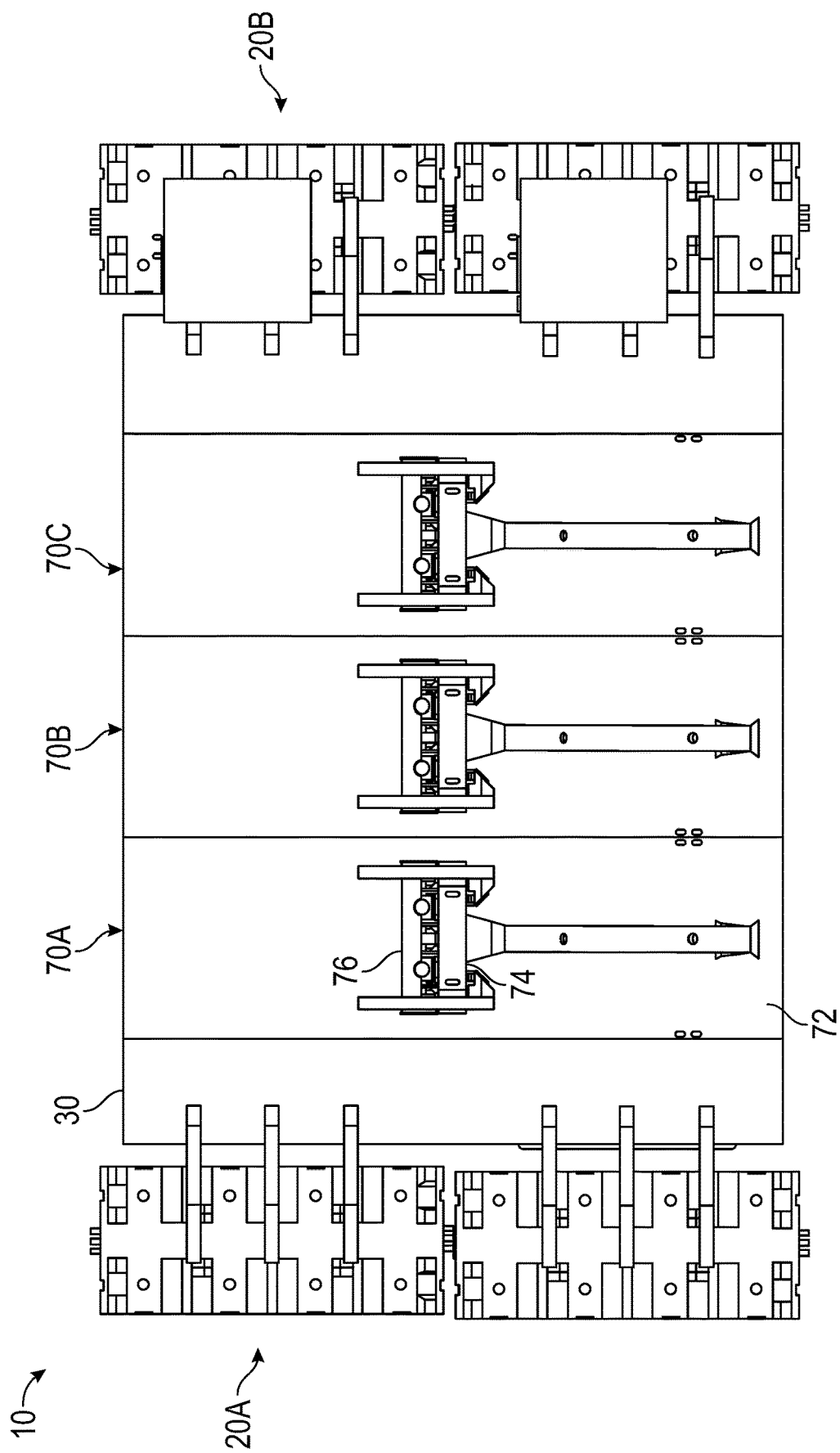
Figure 8A:
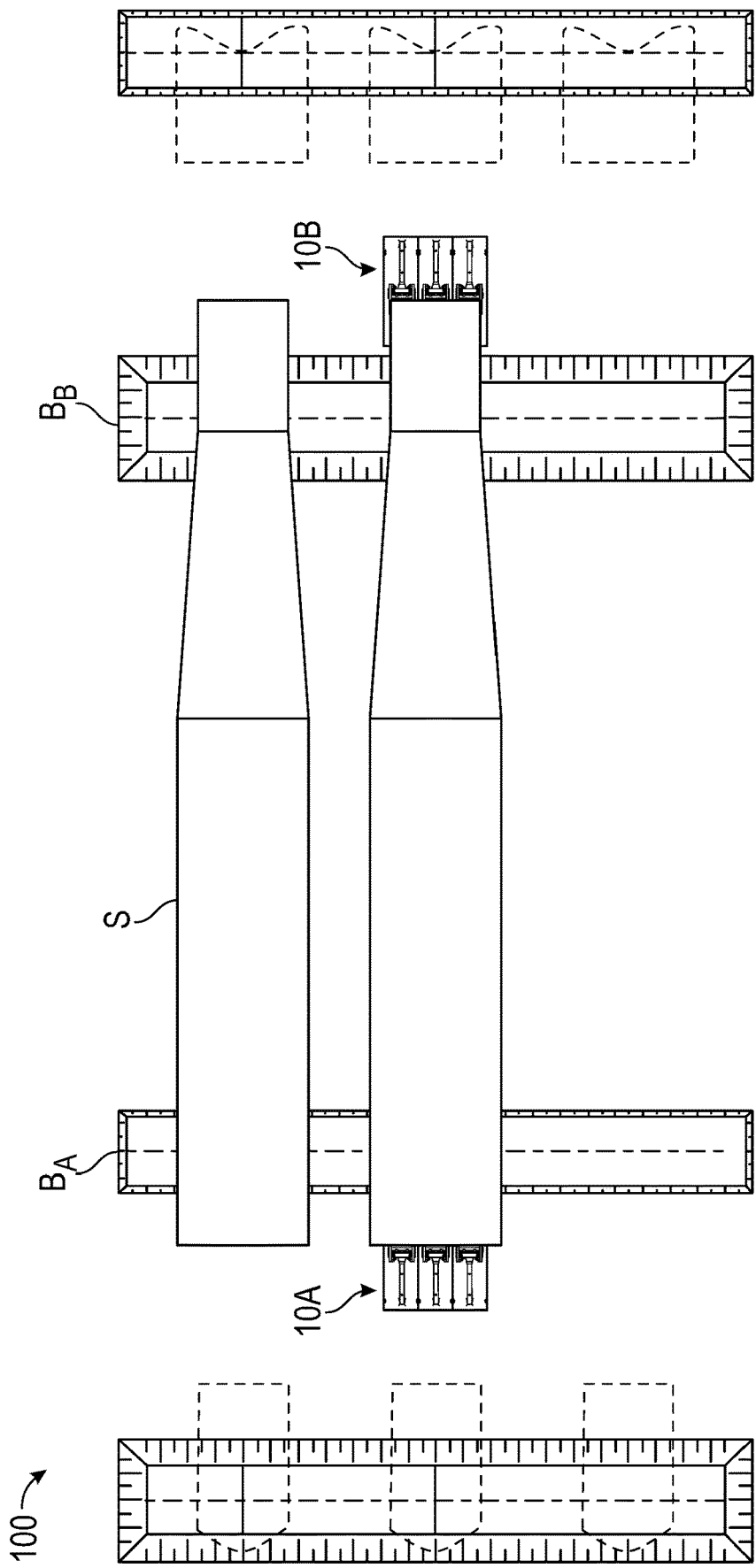
FIGS. 8A-8E illustrate plan, elevational, and perspective end views of the disclosed lift unit in a first stage of moving a structural element.
Figure 8B:
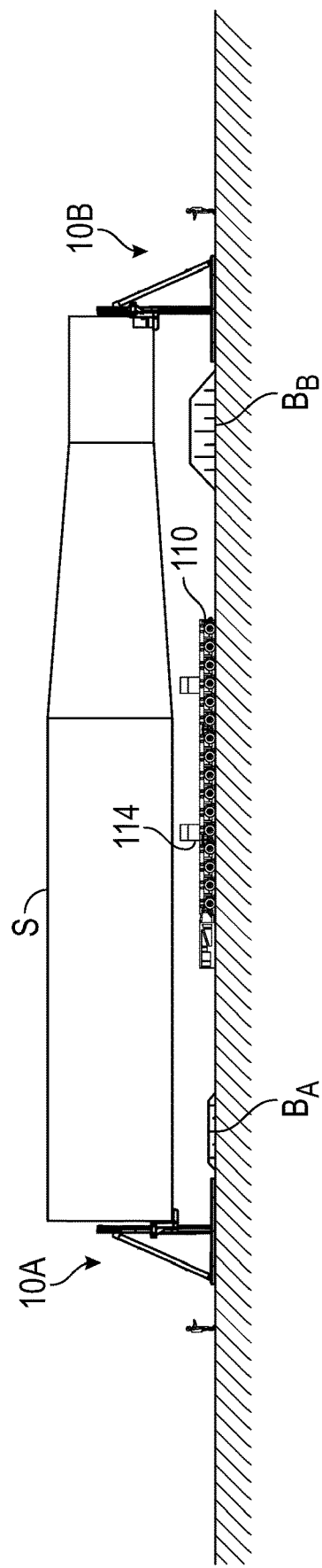
Figure 8C:
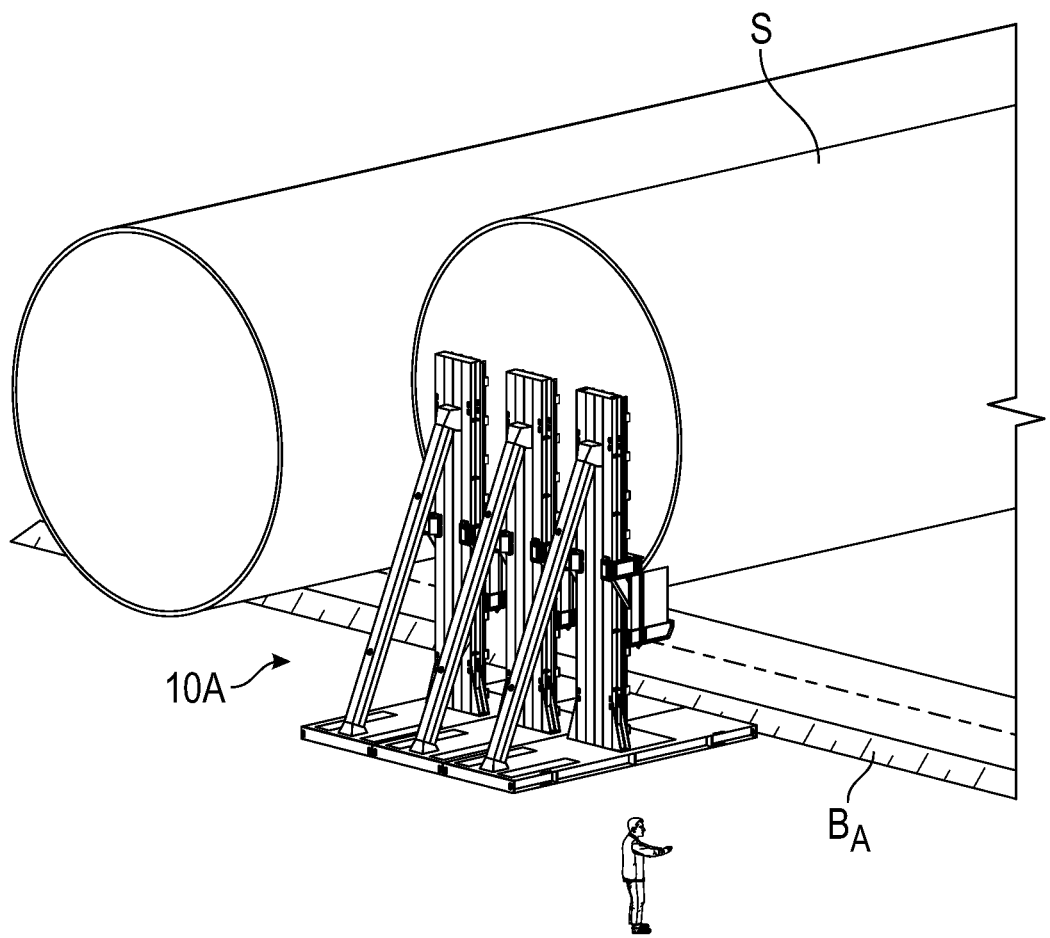
Figure 8D:
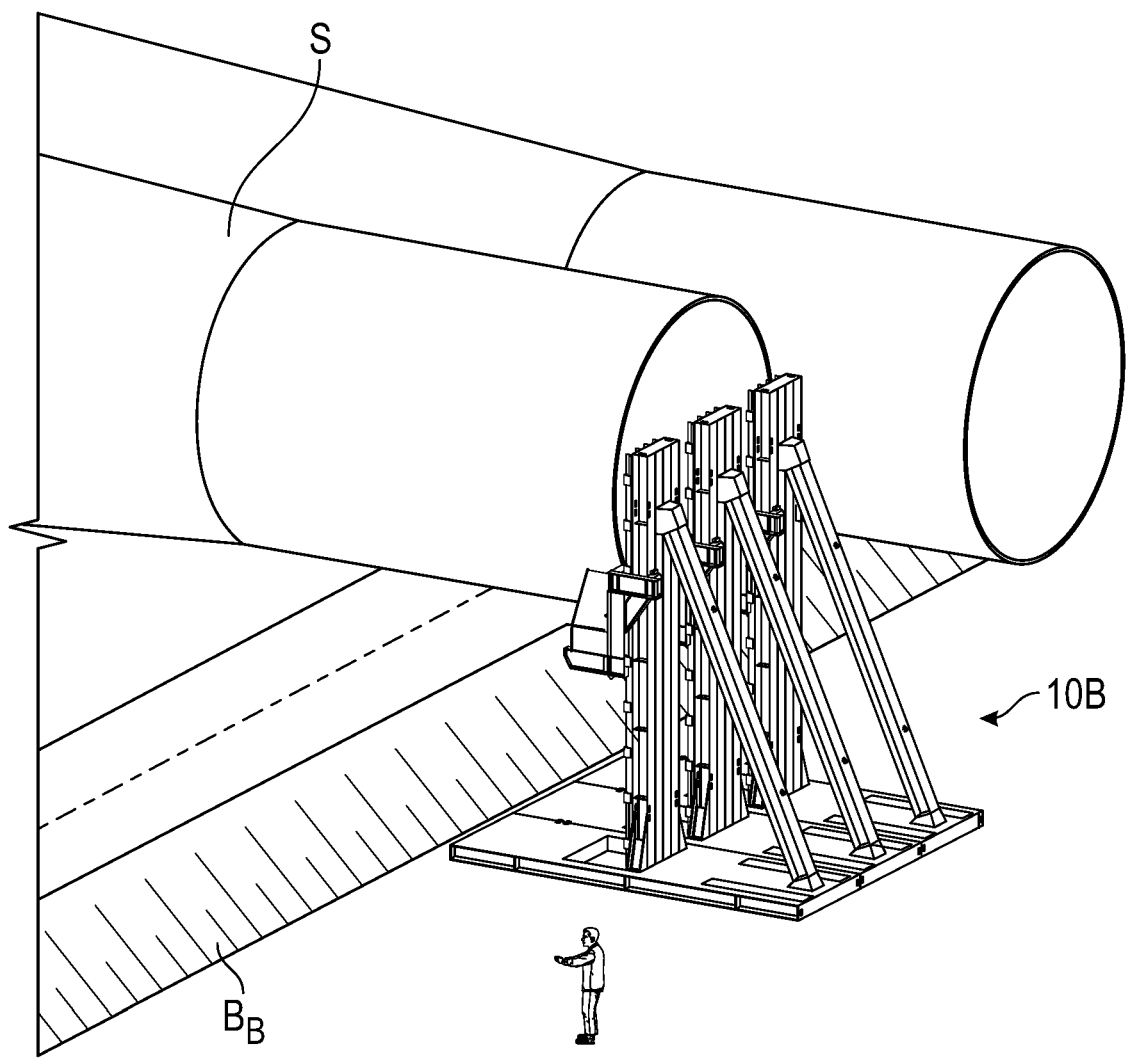
Figure 8E:
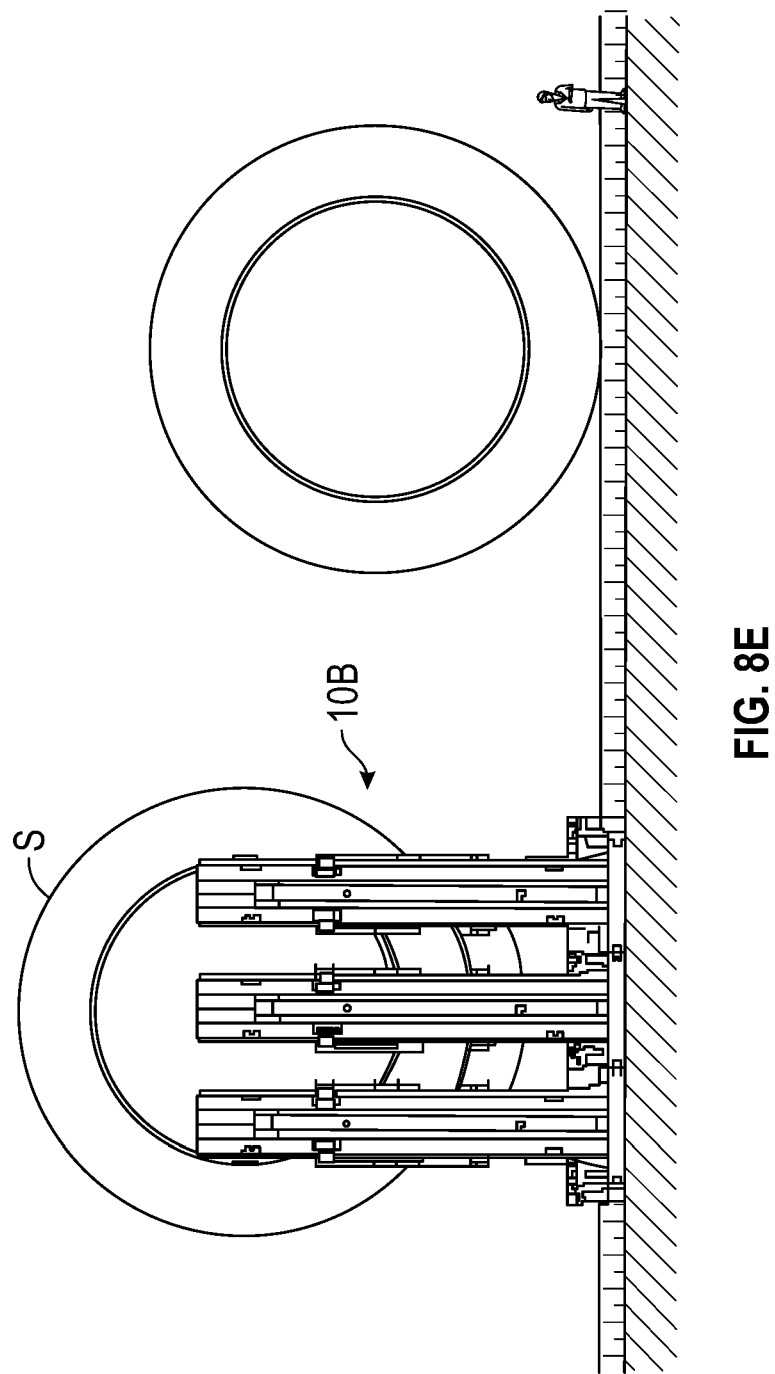

As shown in the plan view of FIG. 6B, the bed 30 may be wider to accommodate the side-by-side arrangements of the lifts 70A-C. Dual pairs of transports 20A-B can be used to transport and support the wider bed 30. As before, one or more actuator units 60 on the lift unit 10 can provide power and control of the side-by-side lifts 70A-C. Again, further details related to these lifts 70A-C, the actuators 78 used with the elevator 76, and other related elements are disclosed in the incorporated '490 application.

The process for moving a heavy, oversized load, such as a monopile S, to a staging area using this lift unit 10 is similar to those discussed previously. Rather than engaging the opposing sides at the end of the load, however, these side-by-side lifts 70A-C engage their supports under the end of the load. In the lift system (100), lift units 10A-B are arranged at ends of the load, and the beds 30 are lowered to the ground for support. The side-by-side lifts 70A-C on the units 10A-B lift the load from mobile transports (110), allowing the transports (110) to be removed before the lift units 10A-B lower the load to the sand bunds or the like. Because the load may have a cylindrical shape, the supports 77 can be modified appropriately and adapters P as noted can be used. If the load is rectilinear in shape, then the supports 77 as shown can be used. These and other modifications would be appreciated based on the teachings of the present disclosure.

In the previous examples, the lift units 10 of the present disclosure have used mobile transports 20A-B and a bed 30 to position the respective lifts relative to the ends of the load. Because the bed is raised while the transport is moved, the bed is placed on the ground during the lifting operation so that direct support can be obtained from the ground. Other arrangements are possible.

For example, FIG. 7A-7B illustrate a front elevational view and a side view of yet another lift unit 10 of the present disclosure. As before, the lift unit 10 is mobile, being configured to move or be moved. Not unlike the configuration in FIGS. 6A-B, this lift unit 10 includes a plurality of lifts 70A-C mounted side-by-side. Each of these lifts 70A-C is an independent component that can be moved using a transport (not shown), such as a self-powered mobile transport, a forklift, or the like. Moreover, as with other configurations, each of these lifts 70A-C includes a tower 74 extending from a base 72 and includes an actuator 78 and an elevator 76 that can raise and lower a support along the tower 74.

In this instance, the base 72 acts as a bed for the lift 70A-C with the base 72 providing a pad to support the lift 70A-C at a site and to transfer the load to the ground surface. Because the load is to be supported on opposing ends by opposing lift units 10, which are set adjacent the ends of the load, the lifts 70A-B may not require a front extent of the base 110 or other form of front brace. As shown, they do have such a feature of a front-extending base 100. A counterweight (not shown) can be placed on the back extent of the base 110 against which the foot of the back brace can engage.

In general, the support 77 can include forks, a platform, or the like extending horizontally from the tower. Because the load may have a cylindrical shape as shown with the monopile S here, spacers or adapters P can be used for the supports 77 to saddle the counter of the load. As further shown, couplings in the form of slings, absorbers, dampers, or the like can be hingedly connected between the adapters P to provide a further support area under the end of the monopile.

Figure 9A:
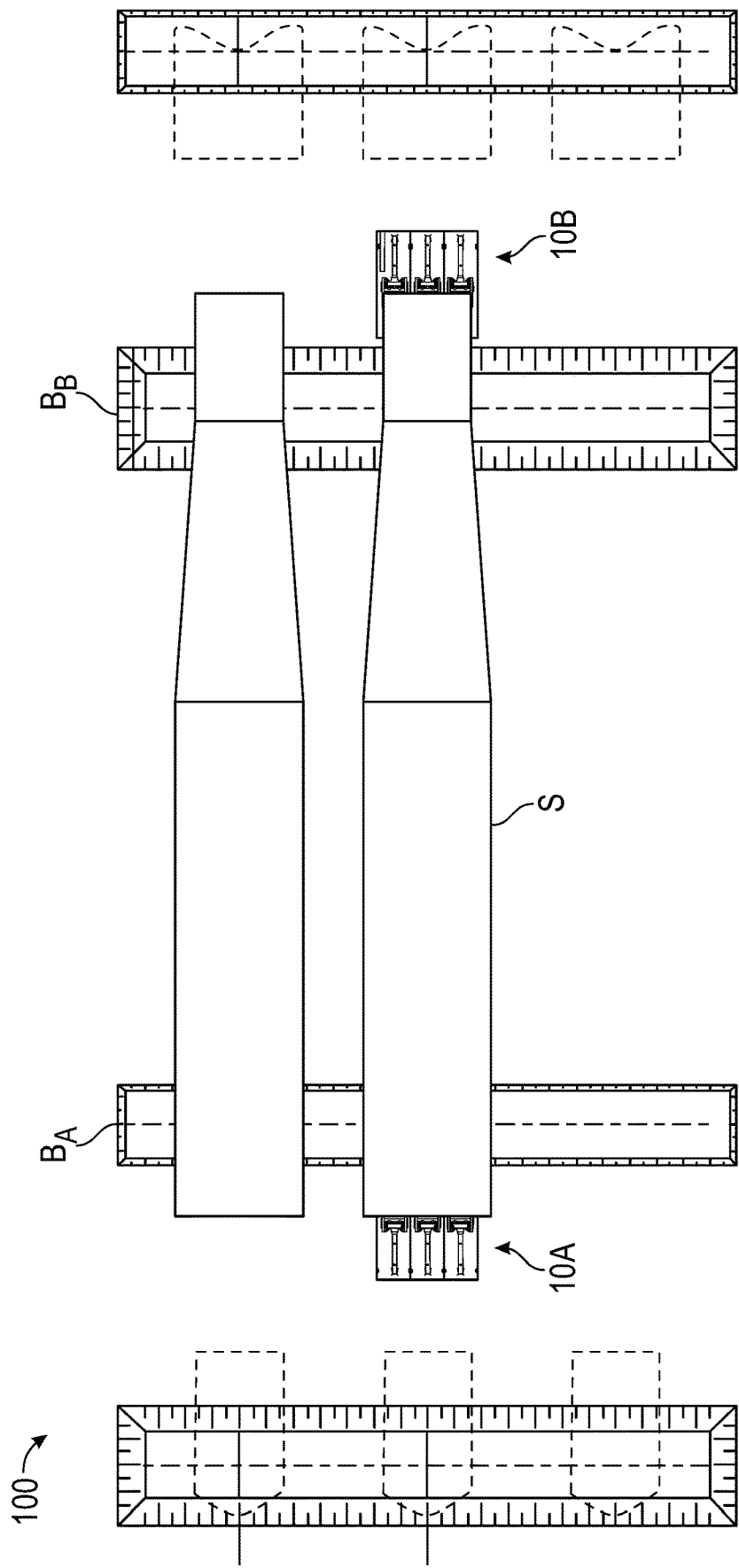
FIGS. 9A-9C illustrate plan, elevational, and perspective views of the disclosed lift unit in subsequent stages of moving a structural element.
Figure 9B:
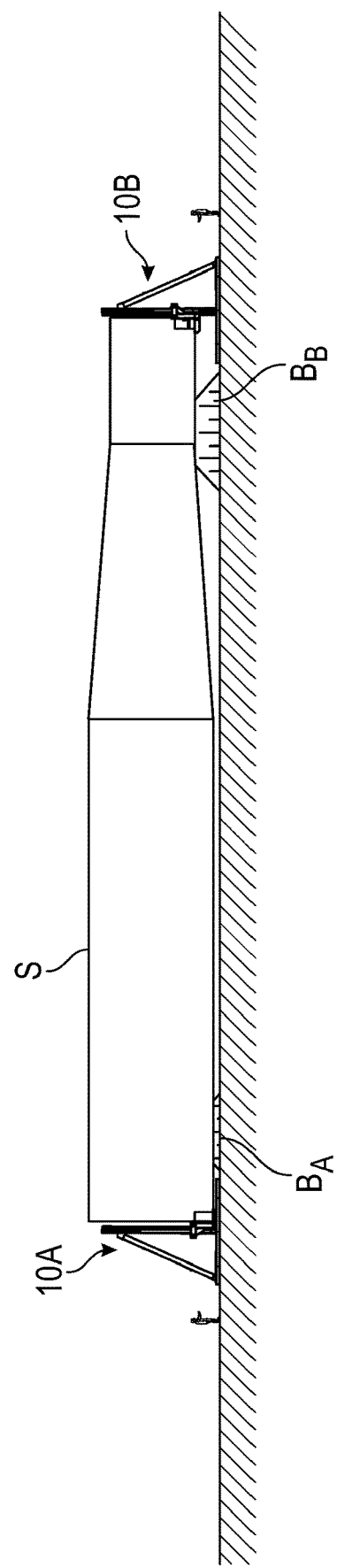
Figure 9C:
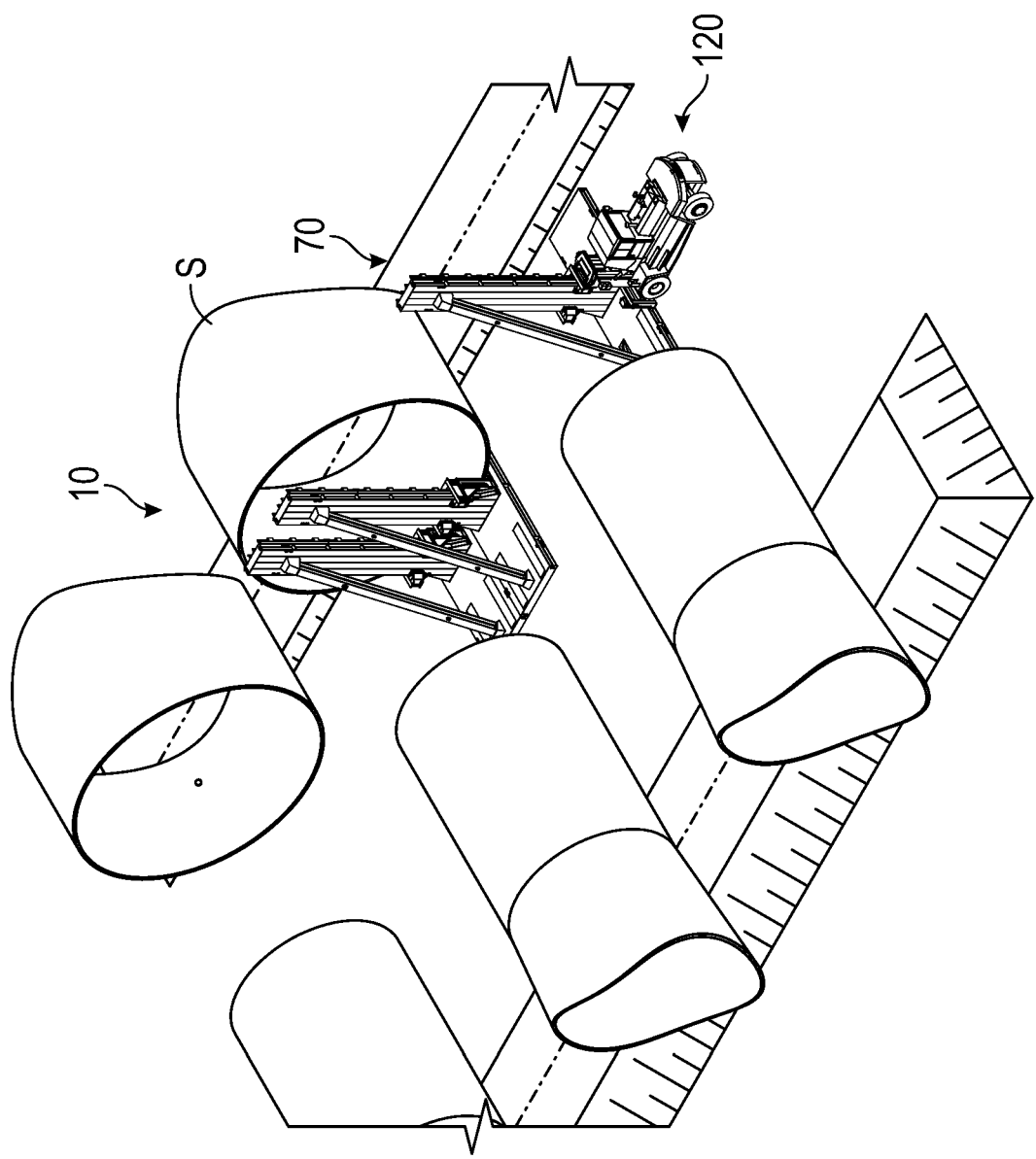

The process for moving a heavy, oversized load, such as a monopile S, to a staging area using this lift unit 10 is similar to those discussed previously. For example, FIGS. 8A-8E illustrate plan, elevational, and perspective end views of a lift system 100 having the disclosed lift units 10A-B in a first stage of moving a monopile S, and FIGS. 9A-9C illustrate plan, elevational, and perspective views of the disclosed lift system 100 in subsequent stages of moving the monopile S.

Again, operators first build an arrangement of parallel sand bunds or berms $B_{A-B}$ at the staging area. Each row of sand bunds $B_{A-B}$ may have a lower profile bund $B_A$ to support the larger diameter of the monopile S and may have a higher profile bund $B_B$ to support the reduced diameter of the monopile S. Using the lift units 10A-B of the present disclosure and the techniques disclosed herein, the heights of these bunds $B_{A-B}$ is not as great as conventionally required, as will be made clear below.

The monopile S is transported to the staging area by carrying the monopipe S on one or more mobile transports 110. Once the monopile S is in position with its ends positioned over the sand bunds $B_{A-B}$, the lift units 10A-B are arranged at the opposing ends of the monopile S. For example, a fork lift can move the lifts 70A-C of each unit 10A-B in place and properly aligned side-by-side to face the end of the monopile S. For stability and support, the number of side-by-side lifts 70A-C used at one end preferably matches the number used at the other end.

With the lift units 10A-B arranged, the monopile S is lifted relative to the ground and lifted off the saddles 114 of the mobile transports 110 by operating the lift units 10A-B at the opposing ends. In lifting the ends of the monopile S, the supports of the side-by-side lifts 70A-C are engaged at the opposing ends the load, and the opposing ends of the load are lifted by operating each of the side-by-side lifts 70A-C together.

Then, as shown in FIGS. 9A-9B, the lift units 10A-B supporting the monopile S allow the mobile transports 110 to be removed from underneath. Due to the lifted height of the monopile S, the saddles 114 can be passed from under the monopile S. Once the mobile transports 110 are removed, the monopile S is lowered onto the sand bunds $B_{A-B}$ by operating the lift units 10A-B at the opposing ends. As can be seen, the sand bunds $B_{A-B}$ with their low profiles require less sand to be built up because the lift units 10A-B of the present disclosure can lift the monopile S a sufficient height and can lower the monopile S lower to the ground when done.

Once lifting and lowering are complete, the lifts 70A-C of the units 10A-C can be rearranged for the next monopile S. For example, FIG. 9C shows how the lifts 70A-C for the units 10 can be moved and arranged using a transport, which is shown here as a forklift 120.

Figure 10:
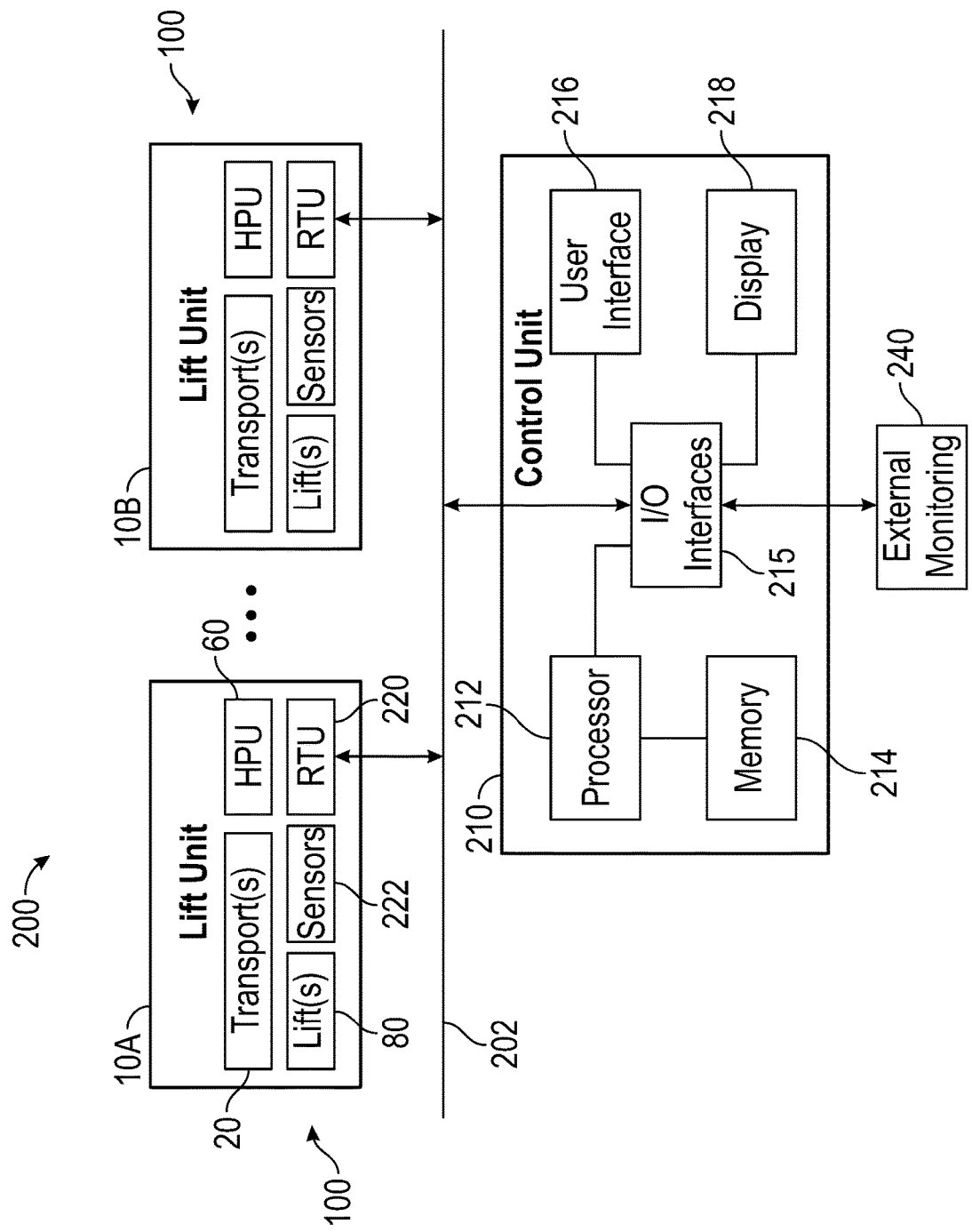
FIG. 10 illustrates a schematic view of a control system for the disclosed lift system.

In each of the lift units 10 and in the overall lift system 100 disclosed herein, one or more controllers can be operably connected to each of the lifts and can be configured to operate the lifts concurrently and independently so the load can be raised and lowered while maintaining balance and stability. Along these lines, FIG. 10 illustrates a schematic view of a control system 200 for the disclosed lift system 100.

In general, each of the lift units 10A-B that are arranged at opposing ends of the load are schematically shown to include dedicated transport(s) 20, lift(s) 80, an actuator unit 60, a local controller 220, and sensors 222. As noted, some lift units 10A-B may not include dedicated transport(s) 20 while others do. The lift(s) 80 can generally include the telescopic hydraulic cylinders, the tower and elevator configurations, or the like, as disclosed herein. The actuator unit 60 can be a power unit, such as a hydraulic power unit (HPU), electric generator, or the like, and the unit 60 can include pumps, valves, motors, and other necessary components.

The control system 200 is disposed in operational communication with each of the lift units 10A-B for monitoring and controlling the hydraulics, power, etc. of the actuators (e.g., actuator units 60, elevator actuators 78, etc.) and for monitoring and controlling the height of the supports (e.g., 54, 77, etc.) in lifting a load, such as the previously-shown monopile. To maintain the load level and supported, the control system 200 can operate the lift units 10A-B concurrently to lift (raise/lower) the load (i.e., the system 200 can operate the lifts 80 on the lift units 10A-B to stroke together in unison), and the control system 200 can individually control each lift 80 on the lift units 10A-B (i.e., the system 200 can operate a given lift 80 to stroke on its own). Stability of the load is important due to its length so the independent control of each lift 80 by the control system 200 can be used to fine tune the support, level, and balance of the load during the lifting (raising/lowering).

The control system 200 can take a number of configurations. As shown in the present example, the control system 200 includes a control unit 210 having a processing unit 212, memory 214, input-output interfaces 215, a user interface 216, and a display 218, among other necessary components. The control unit 210 can be a general purpose computer or a dedicated computing device. The processing unit 212 and memory 214 can use any acceptable equipment suited for use in the field at a site. For example, the processing unit 212 can include a suitable processor, digital electronic circuitry, computer hardware, computer firmware, computer software, and any combination thereof. The memory 214 can include any suitable storage device for computer program instructions and data, such as EPROM, EEPROM, flash memory device, magnetic disks, magneto-optical disks, ASICs (application-specific integrated circuits), etc.

The user interface 216 and display 218 allow operators to monitor and control the lift operation of the lift system (50) and monitor and control the stability of the load (10). The input-output interfaces 215 connects with one or more communication links 202, which can use wired communications, although wireless communication can be used. Each of the lift units 10A-B connects to the central control unit 210 and includes components of the lift units 10A-B of the present disclosure, such as the actuator lifts and its features. The lift unit 10A-B includes sensors 222 to monitor stroke and load of the lifts 80. Sensors 220 can be used to monitor hydraulic pressure, power, etc. and to monitor the height of the lifts support. Other sensors 222 can be used, such as stain gauges, load cells, and like to monitor parameters needed for control and monitoring of the lift's operation. The lift unit 10A-B can further include its own controller 220, such as a remote terminal unit (RTU) or other electronic device having a microprocessor that can interface with components of the lift unit 100a-n and the central control unit 210.

The lift units 10A-B can have their own power source 60 (or they can connect to an external; power source). Shown here is a hydraulic pressure unit 60 that provides the hydraulic pressure for the various lifts 80. One or more such hydraulic pressure units 60 may be used, and redundancy systems may be provided. Each lift unit 10A-B can have its own hydraulic pressure unit 60. Either way, the hydraulic pressure unit 60 is connected to the control unit 210, which can monitor and control the units 10A-B and the hydraulic pressure supplied.

As shown, the control unit 210 can further connect to external monitoring equipment 240, such as used to monitor the load with respect to its level, center of gravity, load distribution, etc. This external monitoring equipment 240 can include optical device, level gauges, strain gauges, load cells, inclinometers, and the like for monitoring the load during lifting for level, balance, stability, etc. Additionally, the external monitoring equipment 240 can use surveying components to monitor each of the lifts 80 for settlement in the ground. During operation, for example, the actuator of a lift 80 may show proper stroke and load readings, but the lift 80 itself may have begun to settle or sink into the ground during the lifting. The external surveying equipment, which can uses laser sights and the like, can detect the settling of the lifts 80 and units 10A-B during operation.

The disclosed system 100, lift units 10, and lifts 40, 70 have a number of advantages. After setup, the lift system 100 only requires one centralized operator, which may not be possible with conventional lifting techniques that use multiple cranes or the like. In contrast to existing jack ups, the disclosed lift system 100 has a low starting height. For this reason, there is no need to raise the structural element S (e.g., monopile) to an initial height before using the disclosed lift system 100 to lift the element S to further heights. Conventional jack-up systems can require the element to be first raised to an initial height to allow the jacks to be placed under the element for lifting.

Operation of the lift units 10 and the lift system 100 requires less time than conventional jack-up systems, which require successive jack-up components to be transported and used. The disclosed lift units 100 can be disassembled for transport, and the system 100 can be shipped in containers where needed. This allows the system's components to be moved and set up with equipment on hand with less time required to assemble and disassemble.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus used in moving a load from one location to another location, the load being heavy and oversized and having opposing sides, the apparatus comprising:
   a pair of mobile transport units disposed side-by-side and having a bed connected therebetween, the pair of mobile transport units being mobile and being configured to raise and lower the bed relative to the ground;
   opposing lifts disposed on the bed and being arranged to oppose one another on the bed for placement adjacent the opposing sides the load, each of the one opposing lifts comprising a support, each of the supports being configured to support a portion of the load; and
   at least one actuator associated with the opposing lifts and being configured to raise and lower the supports on the one opposing lifts relative to the bed.

2. The apparatus of claim 1, wherein each of the mobile transport units of the pair comprises:
   a chassis having wheels, the wheels being powered for mobility on the ground, the chassis being connected to the bed, and
   a lift mechanism configured to raise and lower the chassis relative to the wheels on which the chassis is supported.

3. The apparatus of claim 1, wherein each of the opposing lifts comprises a telescopic hydraulic cylinder extending vertically from the bed; and wherein the at least one actuator comprises a hydraulic pump connected between the telescopic hydraulic cylinder and a hydraulic reservoir.

4. The apparatus of claim 1, wherein the support of each opposing lift comprises a cradle connected by a pivotable joint to the opposing lift.

5. The apparatus of claim 1, further comprising at least one sling connected between the supports on the opposing lifts.

6. The apparatus of claim 1, wherein each of the opposing lifts comprises:
   a tower extending vertically from the bed and having a first guide disposed therealong; and
   an elevator disposed on the tower, the elevator having the support and having a second guide, the support extending from the elevator outward from the tower and configured to support a portion adjacent the opposing side of the load, the second guide of the elevator configured to ride along the first guide of the tower; and
   wherein the at least one actuator is connected to the elevator of the tower and is configured to move the elevator vertically along the tower.

7. The apparatus of claim 1, wherein the apparatus further comprises a controller operably connected to each of the opposing lifts, the controller configured to operate the opposing lifts concurrently and independently.

8. A system for moving a heavy oversized load, the system comprising:
   a pair of the apparatus according to claim 1 for arrangement at opposing ends of the load.

9. The system of claim 8, further comprising one or more self-powered mobile transports configured to move and carry the load thereon, wherein the pair of the apparatus is configured to raise and lower the load relative to the one or more self-powered mobile transports.

10. An apparatus used in moving a load from one location to another location, the load being heavy and oversized and having opposing sides, the apparatus comprising:
    a pair of mobile transport units disposed side-by-side and having a bed connected therebetween, the pair of mobile transport units being mobile and being configured to raise and lower the bed relative to the ground;
    side-by-side lifts disposed on the bed and being arranged side-by-side on the bed for placement adjacent one of the opposing sides of the load, each of the side-by-side lifts having a support facing toward a same side of the bed, each of the supports being configured to support a portion of the load; and
    at least one actuator associated with the side-by-side lifts and being configured to raise and lower the supports on the side-by-side lifts relative to the bed.

11. The apparatus of claim 10, wherein each of the side-by-side lifts comprises:
    a tower extending vertically from the bed and having a first guide disposed therealong; and
    an elevator disposed on the tower, the elevator having the support and having a second guide, the support extending from the elevator outward from the tower and configured to support a portion adjacent the opposing side of the load, the second guide of the elevator configured to ride along the first guide of the tower; and wherein the at least one actuator is connected to the elevator of the tower and is configured to move the elevator vertically along the tower.

12. The apparatus of claim 10, wherein the apparatus further comprises a controller operably connected to each of the side-by-side lifts, the controller configured to operate the side-by-side lifts concurrently and independently.

13. A system for moving a heavy oversized load, the system comprising:
a pair of the apparatus according to claim 10, for arrangement at opposing ends of the load.

14. The system of claim 13, further comprising one or more self-powered mobile transports configured to move and carry the load thereon, wherein the pair of the apparatus is configured to raise and lower the load relative to the one or more mobile transports.

15. The apparatus of claim 10, wherein each of the mobile transport units of the pair comprises:
a chassis having wheels, the wheels being powered for mobility on the ground, the chassis being connected to the bed, and
a lift mechanism configured to raise and lower the chassis relative to the wheels on which the chassis is supported.

16. A method for moving a load that is heavy and oversized, the method comprising:
transporting the load to a destination having structural supports by carrying the load on one or more self-powered mobile transports;
arranging first and second pairs of mobile transport units at opposing ends of the load at the destination by moving the first and second pairs of mobile transport units adjacent the opposing ends of the load, the first pair of mobile transport units having a first bed connected therebetween and having first opposing lifts disposed on the first bed, the second pair of mobile transport units having a second bed connected therebetween and having second opposing lifts disposed on the second bed;
lowering the first and second pairs of mobile transport units to place first and second beds on the ground;
lifting the load from the one or more self-powered mobile transports by operating the first and second opposing lifts of the first and second pairs of mobile transport units at the opposing ends;
supporting the lifted load with the first and second opposing lifts of the first and second pairs of mobile transport units while removing the one or more self-powered mobile transports from under the lifted load; and
lowering the load onto the structural supports by operating the first and second opposing lifts of the first and second pairs of mobile transport units at the opposing ends.

17. The method of claim 16, wherein arranging the first and second pairs of mobile transport units at the opposing ends of the load comprises arranging, at each opposing end of the load, the respective first and second opposing lifts on opposing sides of the load.

18. The method of claim 17, wherein lifting the load from the one or more self-powered mobile transports by operating the first and second opposing lifts of the first and second pairs of mobile transport units comprises:
engaging supports of the first and second opposing lifts at the opposing ends the load; and
lifting the opposing ends of the load relative to the first and second beds by operating each of the respective first and second opposing lifts arranged on the opposing sides.

19. The method of claim 18, wherein operating each of the respective first and second opposing lifts arranged on the opposing sides comprises:
operating a telescopic hydraulic cylinder of each opposing lift to move the support; or
moving an elevator on a tower of each opposing lift to move the support.

20. The method of claim 16, comprising building sand bunds for the structural supports at the destination, wherein lowering the load onto the structural supports comprises placing the load on the sand bunds.

21. The method of claim 16, wherein carrying the load on the one or more self-powered mobile transports comprises supporting the load on a plurality of saddles arranged across a parallel array of the one or more self-powered mobile transports.

22. A method for moving a load that is heavy and oversized, the method comprising:
transporting the load to a destination having structural supports by carrying the load on one or more self-powered mobile transports;
arranging first and second pairs of mobile transport units at opposing ends of the load at the destination by moving the first and second pairs of mobile transport units adjacent the opposing ends of the load, the first pair of mobile transport units having a first bed connected therebetween and having first side-by-side lifts disposed on the first bed, the second pair of mobile transport units having a second bed connected therebetween and having second side-by-side lifts disposed on the second bed;
lowering the first and second transport units to place the first and second beds on the ground;
lifting the load from the one or more self-powered mobile transports by operating the first and second side-by-side lifts of the first and second pairs of mobile transfer units at the opposing ends;
supporting the lifted load with the first and second side-by-side lifts of the first and second pairs of mobile transfer units while removing the one or more self-powered mobile transports from under the lifted load; and
lowering the load onto the structural supports by operating the first and second side-by-side lifts of the first and second pairs of mobile transfer units at the opposing ends.

23. The method of claim 22, wherein arranging the first and second pairs of mobile transport units at the opposing ends of the load comprises arranging, at each opposing end of the load, the respective first and second side-by-side lifts, each of the respective first and second side-by-side lifts having a support facing toward a same side of the respective first and second bed.

24. The method of claim 23, wherein lifting the load relative to the ground by operating the first and second side-by-side lifts of the first and second pairs of mobile transport units comprises:
engaging the supports of the first and second side-by-side lifts at the opposing ends the load; and
lifting the opposing ends of the load relative to the first and second beds by operating each of the respective first and second side-by-side lifts arranged at the opposing ends.

25. The method of claim 22, comprising building sand bunds for the structural supports at the destination, wherein lowering the load onto the structural supports comprises placing the load on the sand bunds.

26. The method of claim 22, wherein carrying the load on the one or more self-powered mobile transports comprises supporting the load on a plurality of saddles arranged across a parallel array of the one or more self-powered mobile transports.

* * * * *